US010648994B2

(12) United States Patent
Spong et al.

(10) Patent No.: US 10,648,994 B2
(45) Date of Patent: May 12, 2020

(54) APPARATUS AND METHODS FOR PROCESSING AND CATALOGING OF SAMPLES

(71) Applicant: VistaPath Biosystems Inc., Cambridge, MA (US)

(72) Inventors: Timothy N. Spong, Cambridge, MA (US); Benjamin T. Burley, Cambridge, MA (US)

(73) Assignee: VistaPath Biosystems Inc., Cambridge, MA (US)

( * ) Notice: Subject to any disclaimer, the term of this patent is extended or adjusted under 35 U.S.C. 154(b) by 0 days.

(21) Appl. No.: 16/451,663

(22) Filed: Jun. 25, 2019

(65) Prior Publication Data

US 2020/0011887 A1    Jan. 9, 2020

Related U.S. Application Data

(60) Provisional application No. 62/694,093, filed on Jul. 5, 2018.

(51) Int. Cl.
| | | |
|---|---|---|
| *G01N 35/00* | (2006.01) | |
| *B01L 3/00* | (2006.01) | |
| *G01N 1/28* | (2006.01) | |
| *G01N 1/00* | (2006.01) | |

(52) U.S. Cl.
CPC .......... *G01N 35/00732* (2013.01); *B01L 3/50* (2013.01); *B01L 3/545* (2013.01); *G01N 1/00* (2013.01); *G01N 2035/00752* (2013.01); *G01N 2035/00831* (2013.01)

(58) Field of Classification Search
None
See application file for complete search history.

(56) References Cited

U.S. PATENT DOCUMENTS

| | | | |
|---|---|---|---|
| 5,817,032 | A | 10/1998 | Williamson, IV et al. |
| 2007/0134131 | A1 | 6/2007 | Watson et al. |
| 2010/0167334 | A1* | 7/2010 | Williamson, IV ..... G16H 10/40 435/29 |
| 2016/0085913 | A1* | 3/2016 | Evans .................... A61B 10/00 705/3 |
| 2017/0035513 | A1 | 2/2017 | Mahfouz et al. |

(Continued)

FOREIGN PATENT DOCUMENTS

| | | |
|---|---|---|
| EP | 3339866 A1 | 6/2018 |
| JP | 2017116356 | 6/2017 |

OTHER PUBLICATIONS

International Searching Authority/EP—International Search Report and the Written Opinion, International Application No. PCT/US2019/039229, 29 pages, dated Jan. 24, 2020.

(Continued)

*Primary Examiner* — Kathryn Wright
(74) *Attorney, Agent, or Firm* — Sunstein LLP

(57) ABSTRACT

A device for processing and cataloging of a sample, in a container having a label with identifying data, has a frame; a plurality of cameras mounted to the frame; and a controller system coupled to the cameras, the controller system including a controller and a non-transitory memory storing instructions, which, when executed by the controller, cause carrying out of computer processes that produce a catalog record output characterizing the sample, such record also including the identifying data.

18 Claims, 20 Drawing Sheets

(56) References Cited

U.S. PATENT DOCUMENTS

| | | |
|---|---|---|
| 2017/0087725 A1 | 3/2017 | Neishaboori et al. |
| 2018/0089938 A1 | 3/2018 | Lutnick et al. |
| 2018/0173851 A1* | 6/2018 | Visinoni ................ G01N 1/312 |
| 2019/0105021 A1* | 4/2019 | Von Bueren ....... A61B 10/0096 |
| 2020/0011889 A1* | 1/2020 | Toyoda .................. G01N 35/04 |

OTHER PUBLICATIONS

International Searching Authority/EP—Invitation to Pay Additional Fees together with the Provisional Opinion Accompanying the Partial Search Result, International Application No. PCT/US2019/039229, 21 pages, dated Oct. 18, 2019.

* cited by examiner

APPARATUS AND METHODS FOR PROCESSING AND CATALOGING OF SAMPLES

PRIORITY

This application claims the benefit of U.S. provisional patent application Ser. No. 62/694,093, filed Jul. 5, 2018, which is hereby incorporated, in its entirety, by reference.

TECHNICAL FIELD

The present invention relates to apparatus and methods for processing and cataloging of samples, and more particularly to samples that are tissue specimens (typically in research and clinical laboratories) and items obtained from crime scenes, for evidentiary or investigative purposes.

BACKGROUND ART

Tissue and other biological specimens are modified and analyzed through various medical and research processes in laboratory work, in many cases in very high volumes. These processes generally assess specimens of variable size and detail and require precise and consistent tracking of specimen details and recordkeeping of the necessary work performed on said specimens. In many cases specimens under investigation are unique and cannot be replaced or reproduced if lost, mislabeled, or incorrectly processed. Given the nature of the research and/or clinical work underway, detailed and highly accurate recordkeeping and specimen measuring and tracking are required; this work typically requires great precision while nevertheless being repetitive in nature. Such work can therefore strain human technicians' capacity for accuracy and precision.

SUMMARY OF THE EMBODIMENTS

In accordance with one embodiment of the invention, there is provided a device for processing and cataloging of a sample, in a container having a label with identifying data. In this embodiment, the device includes: a framework defining a work area, wherein the work area includes a location for receiving the container. The device also includes a plurality of cameras mounted to the frame. The device further includes a controller system coupled to the cameras, the controller system including a controller and a non-transitory memory storing instructions, which, when executed by the controller, cause carrying out of computer processes. In this embodiment, the computer processes include:

causing a first one of the cameras to capture an image of the sample in the work area;

causing a second one of the cameras to capture an image of the identifying data;

processing the image of the sample to a data output characterizing attributes of the sample;

integrating the data output into a catalog record output characterizing the sample, such record also including the identifying data; and transmitting the catalog record output over a network to a record system for storage.

Optionally, processing the image of the sample includes forming a composite image that includes the image of the identifying data and the image of the sample. Optionally, causing the first one of the cameras to capture and causing the second of the cameras to capture occur in a manner wherein capturing by each camera occurs approximately simultaneously. Alternatively or additionally, the catalog record output includes the sample image, the image of the identifying data, and a time stamp indicating a time when the images of the identifying data and the sample were captured.

Optionally, the sample is to be transferred to a processing cassette, the processing cassette having second identifying data thereon, and the work area has a location for receiving the cassette while the container has also been received in the work area, and the computer processes executed by the controller further include:

causing one of the cameras to capture an image of the second identifying data;

transforming the originating identifying data and the second identifying data into first and second digitally encoded text respectively; and comparing the first and second digitally encoded text for consistency.

Alternatively or additionally, the computer processes further include causing a selected one of the cameras to capture a set of images documenting a transfer of the sample from the container to the processing cassette. Alternatively or additionally, the captured set of images is a video recording. Alternatively or additionally, the computer processes further include analyzing the captured set of images documenting the transfer to identify an apparent deviation in activity from that associated with a normal transfer. Alternatively or additionally, the deviation is one in which a portion of the sample to be transferred appears to have been modified or lost. Alternatively or additionally, the deviation is one in which the portion of the sample to be transferred has remained in the container. Alternatively or additionally, the deviation is one in which the sample appears to have been transferred to an incorrect processing cassette, based on failure of the second digitally encoded text to match the first digitally encoded text. Alternatively or additionally, the computer processes further include assessing the data output characterizing attributes of the sample for compliance with minimum standards for downstream processing, and, in the event of such compliance, issuing a notice message to the user to submit the sample for downstream processing. Alternatively or additionally, the attributes of the sample used for the assessing include a member selected from the group consisting of size of the sample, dimensions of each piece of the sample, color of each piece of the sample, contour locations in each piece of the sample, and combinations thereof.

Optionally, the instructions establish a computer user interface configured to display to the user a distinct graphical representation of each one of a plurality of portions of the sample, along with an identification of the portion, at least one attribute of the portion, and a location of the portion. Alternatively or additionally, the computer processes further include determining the at least one attribute of the portion by z-axis analysis of the image of the sample. Alternatively or additionally, the computer user interface graphically indicates to the user an apparent deviation in activity from that associated with a normal transfer of the sample. Alternatively or additionally, the computer user interface graphically indicates to the user non-compliance of the attributes of the sample with minimum standards for downstream processing.

In another embodiment, there is provided a non-transitory storage medium in which is stored a data record associated with a catalogued sample, the data record including (i) an image of the sample, (ii) an image of identifying data associated with the sample, wherein the image of the sample and the image of the identifying data have been captured simultaneously, and (iii) a time stamp indicating the time when the images have been captured. Optionally, the data record includes a composite image that includes the image of the sample and the image of the identifying data. Alternatively or additionally, the image of identifying data is associated with a container initially storing the sample, and the data record further includes (iv) an image of the sample transferred to a processing cassette, (v) an image of second identifying data that is associated with the processing cassette, and (vi) a time stamp indicating the time when the image of the sample transferred to the processing cassette and the image of second identifying data were captured.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
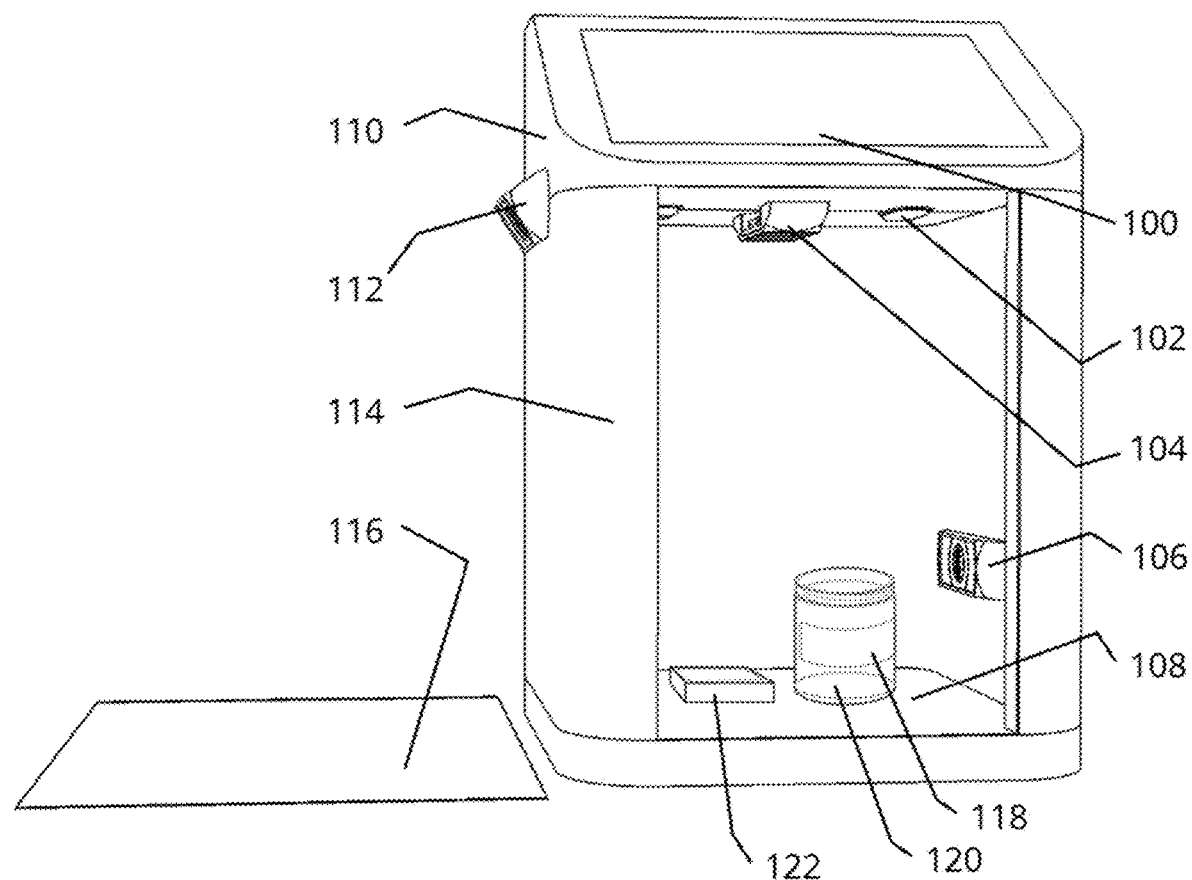
FIG. 1 is a perspective view of hardware and additional items for a device, for processing and cataloging of a tissue specimen, in accordance with an embodiment of the present invention.

Definitions. As used in this description and the accompanying claims, the following terms shall have the meanings indicated, unless the context otherwise requires:

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "controller system" is a set of controllers.

A "set" includes at least one member.

A "sample" is an item that is to be made subject to processing and cataloging for later reference thereto. The term "sample" includes, but is not limited to, a tissue specimen that has been obtained for evaluation, as well as an item, obtained from a crime scene, for evidentiary or investigative purposes.

An "image" of a sample includes a photographic image as well as a video representation. The photographic image and the video representation may optionally be in a digital format, such as a JPEG or MPEG format.

An "intake container" is a container used to initially store the patient tissue specimen and/or the container used for transport and presentation to the relevant pathology laboratory.

A "processing cassette" is a container with slated openings (or other similar features), used to process patient tissue specimens after receipt and intake in the pathology laboratory.

A "requisition" is documentation which describes the sources of the patient tissue specimens, relevant medical and patient identification, and processing required for said tissue specimens. These typically accompany the patient tissue specimen intake container to confirm patient identification and provide detail for processing in the lab.

A "tissue specimen" is biological material including but not limited to tissue from organs, dermis, or other areas. Tissue can be sourced, among other places, from medical procedures including surgery, biopsies, animal testing, and autopsies.

A "touchscreen" is a display device that allows a user to interact with a computer by touching areas on the screen A "software module" is a set of programs that cause a processor to perform a set of "computer processes" as defined herein.

An "electronic medical record" is a record, containing medical, biological, case, or test information pertinent to a subject, that is stored in an electronic format. Such a record is sometimes referred to (among other things) as an electronic medical record (EMR), a record in a lab information system (LIS), or in a lab information management system (LIMS).

A "label" is a designation, applied to a container, that includes data identifying contents of the container. The designation may be achieved by wide variety of methods, including by ink applied directly to the container, by a printed label affixed to the container, and by engraving the container. The designation may be in any of a wide variety of formats including alphanumeric data, bar code, QR code, etc.

A "camera" is device configured to capture, as a photographic or video representation, in two dimensions or three dimensions, an image of a scene, wherein the scene may include a sample.

A "framework" for a device for processing and cataloging of a sample is a structure that mounts a set of cameras configured to capture, among other things, an image of the sample, and that also defines a work area in which the sample is imaged.

A "graphical selector" is a portion of a computer display, exhibiting an icon, device, or button, the invocation of which by a mouse click or other method of graphical interaction, is configured by a computer program to constitute a choice made by a user.

FIG. 1 is a perspective view of hardware for a device, for processing and cataloging of a tissue specimen, in accordance with an embodiment of the present invention. The hardware components function independently, and in conjunction with additional items, for the analysis of the count, size, and other qualitative and quantitative visual features of the tissue specimen.

The system hardware is housed in a main system framework 114 made of rigid plastic, aluminum, or other appropriate material; this embodiment utilizes a rigid plastic enclosure manufactured using a typical injection molding process. The framework is molded in three parts, which are subsequently attached utilizing molded fastener holes for part alignment. This framework 114 includes support and mounts for all hardware components including cameras, lighting, visualization screens, and processing components. One of these hardware components is the main camera 104, which is mounted within the main framework. The framework 114 also includes an interior platform 108 allowing for environmental control of specimen assessment (relating to control of parameters such as light and temperature). This platform may include an area on which to rest the tissue specimens and other materials for the employment of the system on said specimens and additional materials. An intake container 120 which holds the specimens under assessment, is shown on this interior platform 108. The label for this intake container 118, which may include information identifying the sample, is also shown. In this embodiment, intake containers are Thermo Scientific brand Samco Histology Bio-Tite Nonsterile Specimen Containers. These items are available from Thermo Fisher Scientific Inc., Waltham, Mass. The labels 120 shown may be produced from common inkjet printers or more specialized lab processing equipment. A processing cassette 122 may be used to process specimens; specimens are transferred from the intake containers to the processing cassettes during the use of this embodiment of the invention, as further described FIG. 5. In this embodiment of the invention the processing cassettes are Thermo Fisher brand Shandon™ Biopsy Processing/Embedding Cassettes II; these items are available from Thermo Fisher Scientific Inc., Waltham, Mass. The system framework interior of this embodiment may also include a number of markings and other features, located within the field of view of the various cameras, to allow for various calibrations activities. This embodiment of the invention is designed to operate in an existing benchtop area, and to address risks of operator exposure to formalin or other fixing agents, this embodiment is designed to operate within a fume hood or other area with air filtration. Other embodiments may include a self-contained air filtration or air removal system for safe operation in the presence of formaldehyde or other toxic materials.

An interior lighting system 102 may be used to control lighting conditions for computer vision and other activities. In this embodiment, a 12 v DC power supply is used to power LED lighting, in conjunction with a voltage controller to control the voltage to the lighting and therefore the light intensity. Optionally, the intensity is manually controlled or put under control of a computer vision system and processing module, as described in connection with FIG. 3. Electrical and control wiring for this lighting may be run through the system processor cavity region 110. This various wiring may be connected to other components of the embodiment via a set of ports located on the rear of the exterior of the main system framework 114.

This embodiment includes a plurality of cameras providing a visual record of views, both of the main system framework interior and of a region exterior to the framework. These cameras may be configured to operate at various levels of resolution and focal ranges according to context. In this embodiment of the invention, three cameras, namely the primary camera 104, and auxiliary cameras 106 and 112, are used for providing the visual record of tissue specimens and containers, any labeling on containers, barcodes, and notations on containers, as well as other documentation (including but not limited to requisitions). The primary camera 104 may have greater capabilities than the auxiliary cameras 106 and 112; for instance, in this embodiment, the primary camera 104 is a stereo camera capable of documenting the height and configuration of tissue specimens. In this embodiment, a first auxiliary camera 106 is directed towards the system framework interior, with its field of view including the tissue specimen, intake containers, processing cassettes, requisitions, and or other documents associated with the tissue specimen. A second auxiliary camera 112 is directed toward the space near to, but exterior of, the main system framework 114 with a field of view including staging area 116, where associated documents, requisitions, and additional containers and cassettes may be placed and visually documented.

The primary camera 104 which is a stereo camera, has a field of view directed at tissue specimens located in the system framework interior for quantitative and qualitative assessment and analysis of said tissue specimens. In this embodiment, the primary camera is a DUO-MINILX-LV1, available from Code Laboratories, Inc., Henderson, Nev. This camera has a 0.36 MP (752×480) resolution, with a frame rate of 45 FPS at this resolution. In this embodiment, the DUO-MINILX-LV1 can capture images with both of its two lens and sensors, which may be used to determine the z-axis dimension of the tissue specimens under assessment, as further described in connection with FIG. 8. All cameras are connected to the computer hardware performing relevant computer processes; in this embodiment, a Universal Serial Bus (USB) 3.0 port of the computer is coupled via a cable passing through the main system framework 114 and the system processor cavity region 110 as required for connection to a USB hub (as described further in connection with FIG. 2). The exterior of the main system framework is provided with a set of USB ports, coupled to the cable from the computer.

Also, as noted, the embodiment may contain one or more auxiliary cameras 106 and 112. In this embodiment two C920 video cameras available from Logitech of Newark, Calif. are used. These cameras have a resolution of 1080p and capture 30 frames per second at this resolution. These cameras are also connected to the computer hardware using USB connections in a fashion similar to the primary camera 104.

This embodiment includes a touchscreen 100 for user interface for the operation of the system. Other display and user interface arrangements are also possible. Here, an Adafruit HDMI 7" 800×480 Display Backpack (available from Adafruit, New York, N.Y.), with touchscreen, is used. This display provides 800×480 pixel resolution and measures 7" on the diagonal. This display is located on the upper outside face of the main system framework. The operator interacts with the display to manage the visual recording and analysis of tissue specimens as well as other information associated with said tissue specimen processing and assessment. This display also provides an interface for the operator to manage information and activities related to other components of the embodiment, including but not limited to the approval module, management module and information supplied from the electronic medical records system, as described in connection with FIG. 3.

Figure 2:
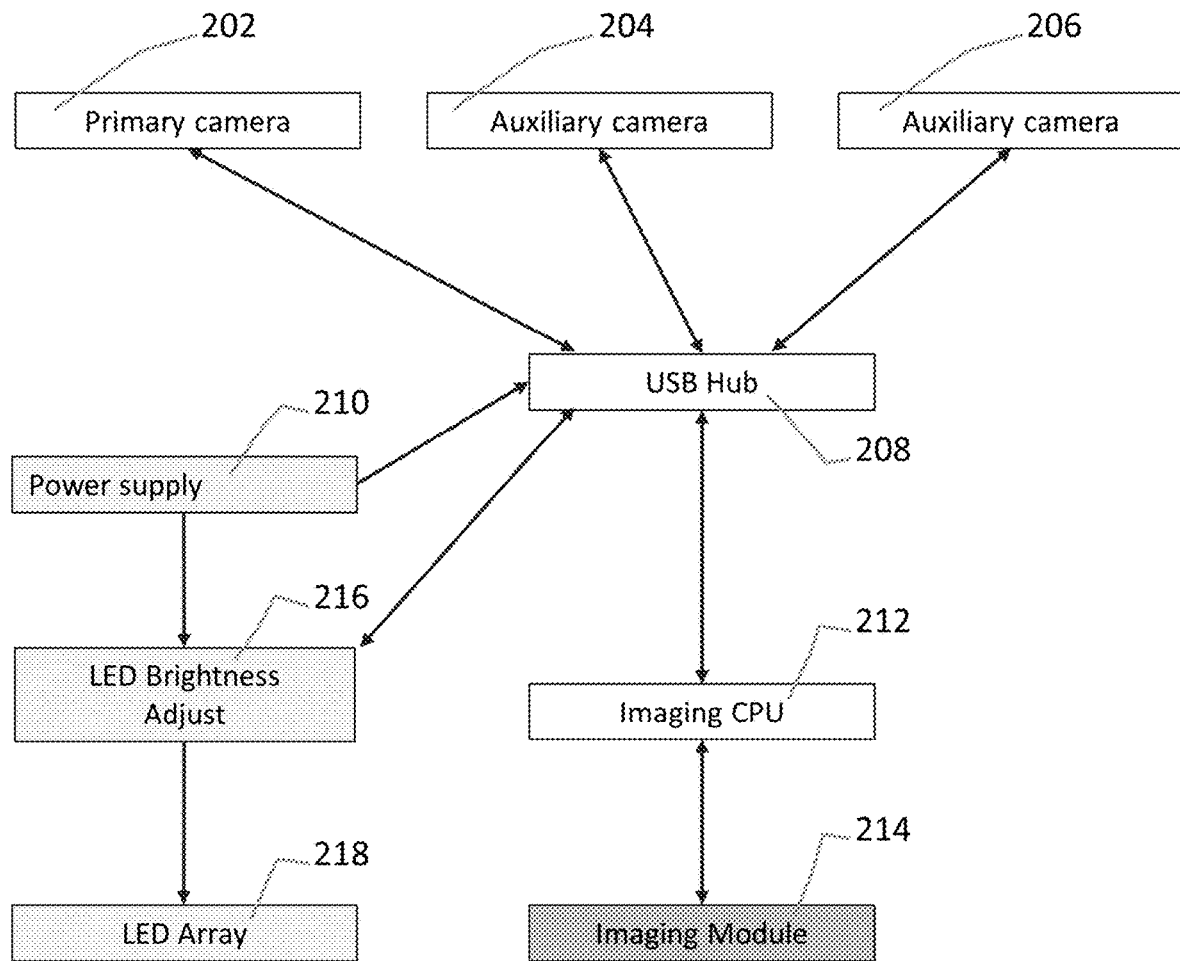
FIG. 2 is block diagram showing interconnection of the hardware components of the device of FIG. 1, for processing and cataloging of a tissue specimen in accordance with an embodiment of the present invention.

FIG. 2 is a block diagram showing the interconnection of components of the device of FIG. 1, for processing and cataloging of a tissue specimen in accordance with an embodiment of the present invention. In this embodiment 3 cameras, one labeled "primary camera", 202, and two labeled "auxiliary camera", 204 and 206, are connected to a USB hub, 208, using standard USB connection cables. These USB cables supply power for the cameras and carries image and other data. This USB hub is powered by 12 v DC power 210 supplied from a standard AC/DC converter utilizing 120 v AC. The USB hub is also connected, via standard USB cables, to the CPU (central processing unit), 212. This CPU performs various computer processes, including the operation of the software components for imaging analysis, the imaging module 214 (described in FIG. 3). In this embodiment this CPU is a common desktop computer running Windows 10 Operating System. This computer could be manufactured by a number of suppliers, for example a Dell Inspiron desktop 3668 (available from Dell of Round Rock, Tex.). This computer would be supplied with a keyboard, from a number of suppliers including the Logitech K360 wireless keyboard (available from Logitech of Newark, Calif.), and a display from a number of suppliers including the Acer K222HQL 21.5 LED (available from Acer of San Jose, Calif.) monitor. In this embodiment this computer is used for the operation of the software components of the embodiment, to operate the cameras and other hardware components of the embodiment. The user may interface with this software via the monitor and keyboard noted here or via the touchscreen described in connection with FIG. 1.

The USB hub shown in FIG. 2 is also connected to a brightness controller, 216, for the LED lighting system described in connection with FIG. 1. In this embodiment a 92-342 LED Lighting Dimmer from Calrad (brightness adjust, available from Calrad of Los Angeles, Calif.) is used to control a Philmore 4-LED 12VDC Square Light Module (light array, available from Philmore of Naples, Fla.), 218. This lighting may be used to create the preferred lighting environment for the image capture of the tissue specimens, the labels, and paperwork placed inside the main system framework. In this embodiment of the invention an additional power supply 210, appropriate to the requirements of the LED lighting, is used.

Figure 3:
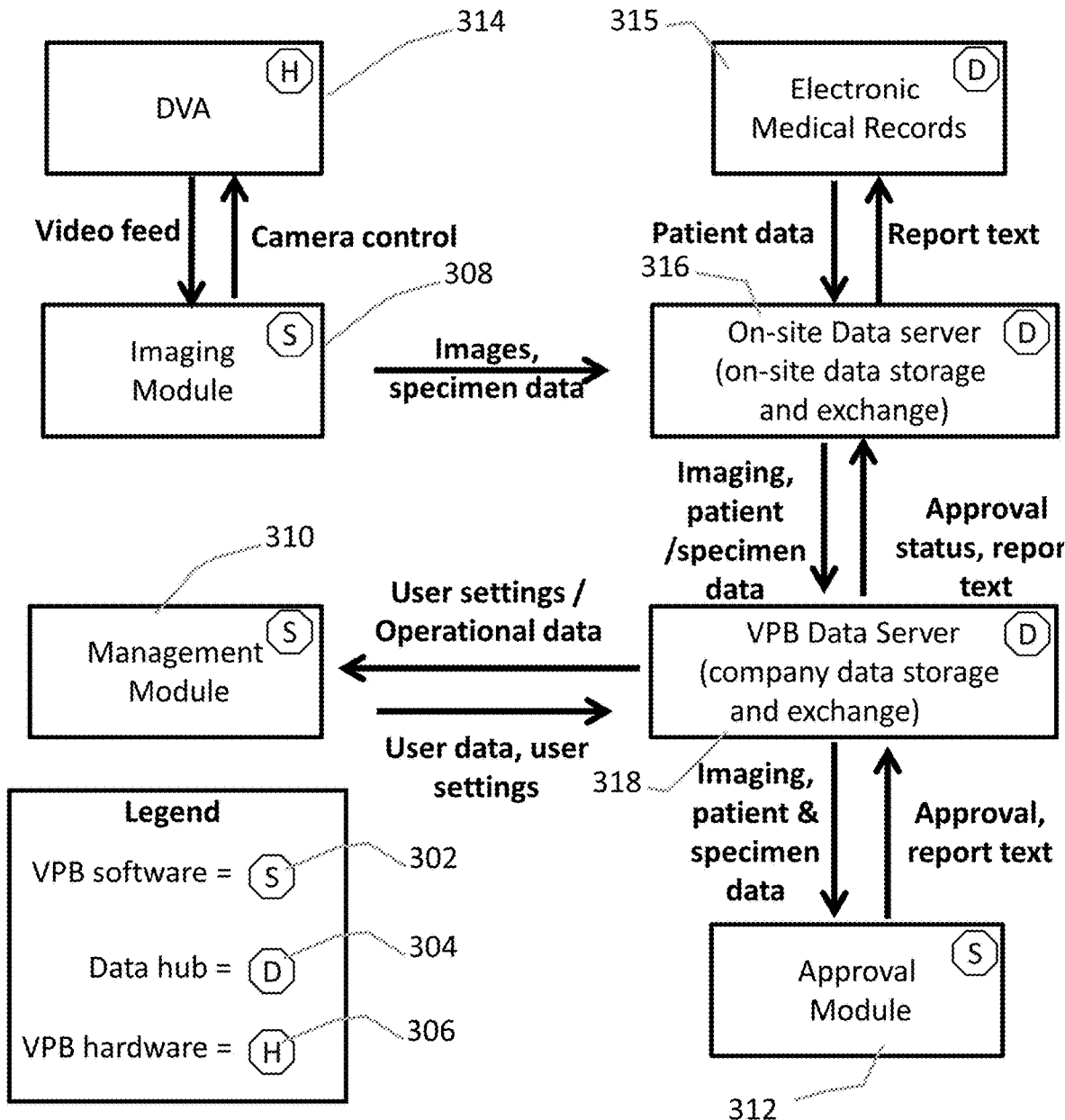
FIG. 3 is a block diagram of software and hardware systems used in the device of FIG. 1, in accordance with an embodiment of the present invention.

FIG. 3 is a block diagram of software and hardware systems used in the device of FIG. 1, in accordance with an embodiment of the present invention. As indicated in the legend for FIG. 3, data related to this invention are exchanged among three types of components. The first type is the VPB (VistaPath Biosystems) software 302; in this embodiment there are three main software modules: the imaging module 308, the management module 310, and the approval module 312, as described in connection with FIG. 4. The second type of component is the data hub 304, which is used for data storage and management as well as various computer processes. These data hubs retain image data, system settings, sample reports, and other relevant information. In this embodiment of the invention data servers are used for this function, which consist of computer hardware for performance of computer processes and data storage, such as the Dell PowerEdge T30 (available from Dell Inc. Round Rock, Tex.). The third type of component is the VPB (VistaPath Biosystems) hardware 306. This type of component of the system is the physical hardware described in connection with FIG. 1.

In this embodiment of the invention, the VPB hardware components deliver image data (described here as "video feed") to the Imaging module. The Digital Vision Assistant, or DVA 314 is the designation for the tissue specimen processor in this embodiment described in connection with FIG. 1. The Imaging module software 308 sends data to control various aspects of the DVA functions (described here as "camera controls"). The imaging module 308 operates on a computer located near the DVA hardware. This computer is connected to a local computer network via hardwired connections such as an ethernet cable, as described in connection with FIG. 2. The imaging module sends image and specimen data, among other data to the on-site data server 316. In this embodiment of the invention, this on-site data server is implemented by a computer system for the storage, management and delivery of data, including among other features standard database properties. The on-site data server has direct access to the Electronic Medical Records 315 a database storing patient information or other information relevant to the specimen under assessment. The electronic record system typically utilizes software provided by companies such as Epic and Cerner. The on-site data server 316 may also have direct access to the VPB data server 318. This VPB data server may be located remotely from the site of specimen processing and cataloging; access to said data hub may be attained via internet providers or by other common means. In this embodiment of the invention, the VPB data server represents a system for the storage, management, and delivery of data, including among other features standard database properties. This VPB data hub may contain similar data to the on-site data server, and allows for connection to additional VPB software. In the case of communication failure between on-site operations and remote data servers, both the data servers 316 and 318 may be able to function independently and retain the capability to support connected software components. In this embodiment, the VPB data hub is directly connected to the VPB software management module 310 and approval module 312. For the interface between the VPB data server and the management module, the server sends user settings and other operational data to the management module and receives data input from users and other user settings, among other potential data exchanges. For the interface between the VPB data server and the approval module, the server sends image, patient, and other specimen data to the approval module, and receives data input from users including report approval or other report assessment data, among other potential data exchanges. These interfaces are described in connection with FIG. 4.

Figure 4:
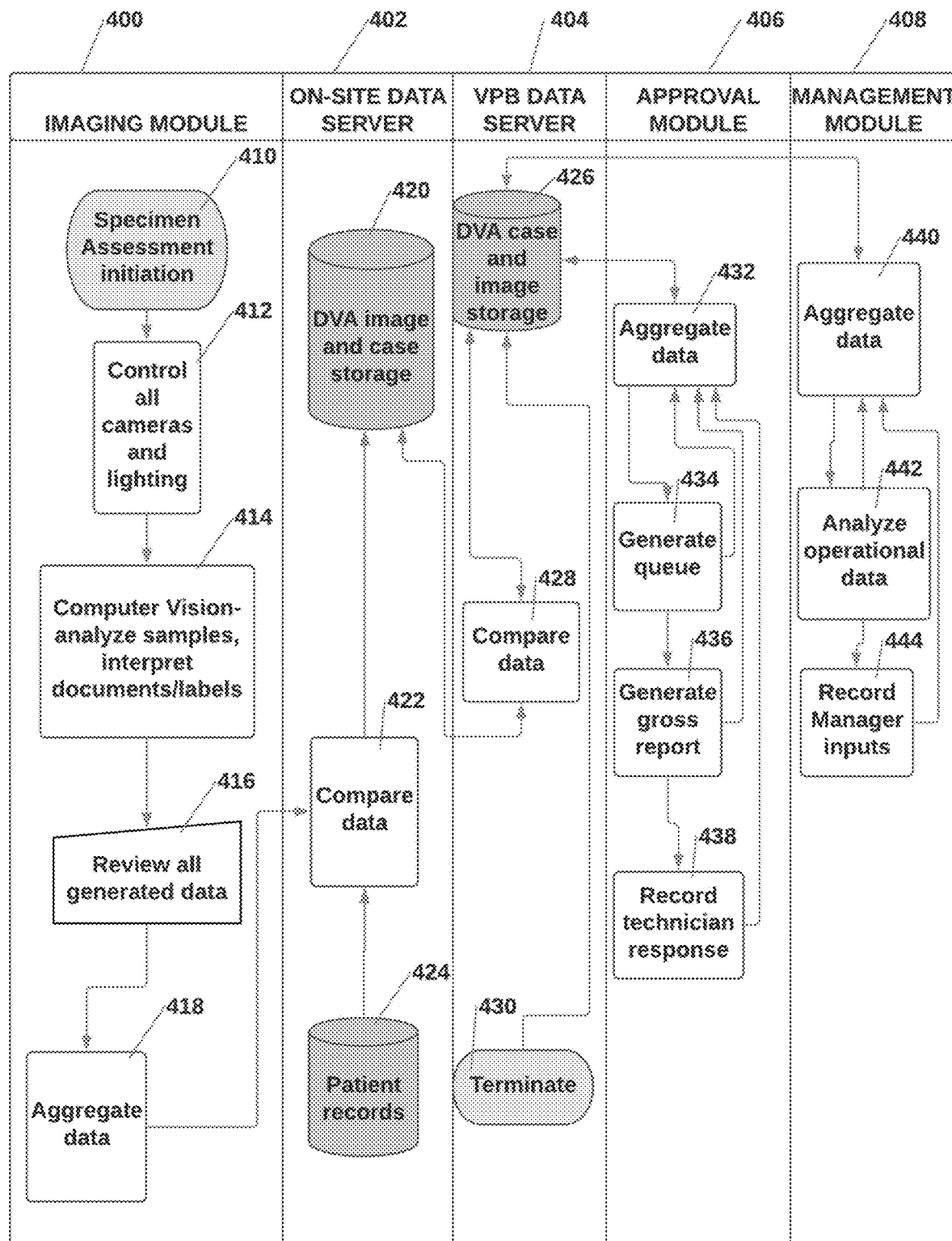
FIG. 4 is block diagram providing an overview of processes carried out by the components of FIG. 3, in accordance with an embodiment of the present invention.

FIG. 4 is a block diagram providing an overview of processes carried out by the components of FIG. 3, in accordance with an embodiment of the present invention. In this figure, a separate column is devoted to each of five components of FIG. 3 and the logical flow for these components and their direct data connections are shown. The imaging module functions 400 begin when the specimen assessment is initiated by the user 410. The imaging module then controls camera and lighting operations 412 and may, for instance, set camera aperture and lighting intensity among other operations. The image data from these cameras are then analyzed in the imaging module's computer vision pipeline 414 (in this description of an embodiment of the invention, in the context of computer vision processes, pipeline refers to the collection of software processes that produce certain image analyses). One component of this computer vision pipeline identifies tissue specimens, calculates the border of said specimens, and generates the dimensions of each specimen in 3 dimensions (x, y, z). The computer vision pipeline may also calculate additional quantitative information on the tissue specimens such as the color and count. Another component of the computer vision pipeline within the imaging module identifies various labelling and barcodes associated with the specimen under assessment, perhaps using Object Character Recognition (OCR). These data are assessed in a quality control process where all relevant data is reviewed 416; these processes determine if the text, barcodes, QR codes, and other encoded textual information are internally consistent and associated with the correct case or other specimen identifier. This process is further described in connection with FIG. 9. While in this current embodiment the quality control process 416 is performed only once, it may alternatively be performed repeatedly throughout the assessment and processing of the specimen. Finally, in process 418 the data generated by the imaging module, including but not limited to the camera images, the tissue specimens' dimensions and colors, and patient information are aggregated, and sent to the on-site data server 402.

For this embodiment of the invention the onsite data server 402 stores and processes data from the DVA and the imaging module 420, connecting to said components using a local computer network. Within the on-site data server, the case and other specimen data supplied from the imaging module are compared in process 422 to the electronic patient records 424, an extension of the quality control processes 416. Relevant text that has been previously identified on containers and paperwork within the field of view of the imaging hardware (cameras) are assessed to confirm they are internally consistent and associated with the correct case or other specimen identifier. Assessment of this information is performed via data exchanged through the on-site data server and the electronic patient records 424. These and other relevant data are also stored in the on-site data server for access by other software modules.

The patient and specimen information stored on the on-site data server 402 are also sent to the VPB data server 404. Notably, in this embodiment, there may be redundant data on the on-site data server 402 and the VPB (Vistapath Biosystems') data server 404. This allows for independent operations of various components of this embodiment of the invention in the case of communication breakdown between the onsite and VPB data servers. This redundant data is compared in process 428 at various points when said connections are active, with conflict management operating according to common database system protocols. For a given case or specimen assessment, processes are terminated 430 when all required data is stored and properly assessed. The approval and management module modules 406 and 408 respectively are connected directly to the VPB server 404 although in other embodiments there could be additional data connections directly to the on-site data server 402.

The approval module 406 receives and aggregates data such as patient identification, image data, analysis on said data from the computer vision pipeline, among other relevant data 432. Based on user-entered criteria for the operations of this specimen assessment process, this module may create a priority for assessment of these specimens by the user. The development of said priority queue 434 may include such criteria as tissue type, time of entry into system, and requirements for processing, among other criteria. In addition, this approval module may aggregate data from the VPB data server to generate a specimen description 436, called a gross report in this embodiment of the invention, for assessment by a technician. A gross report consists of a written description of the specimen(s), including a count of the number of pieces, dimensions for each piece, and description of color and potentially other features. In other embodiments this descriptive report may be identified with another term and may include additional or different attributes for the specimen under assessment. The approval module may also deliver this report and associated data to the user, for their assessment. In this embodiment the user interface displaying this gross report may include the text of the generated report, the patient information, and an indication that all relevant labeling and paperwork are associated with the intended specimen. An example of such a user interface for this embodiment is shown in connection with FIG. 10. After the user assesses this information, the user may accept the report, reject the report, or require amendment of the specimen assessment or report. The technician's approval or rejection of this report is recorded in process 438. Details of these processes are described in greater detail in FIG. 11.

The management module 408 aggregates operational and image data 440 from the VPB data server and performs statistical analysis of said information for assessment of various aspects of this process and said specimens. In this embodiment this analysis includes, for example, tracking and statistical analysis 442 of: each process step, individual user's rate of operation and error rate, the details of the process performed paired with any categorical information about the case and/or lab operations. Various presentations of this and other information are made available to users by various user interfaces. Any user preferences and/or changes to user generated changes to the management module are recorded for subsequent use 444. These software operations are described further in connection with FIGS. 13 and 14.

Figure 5:
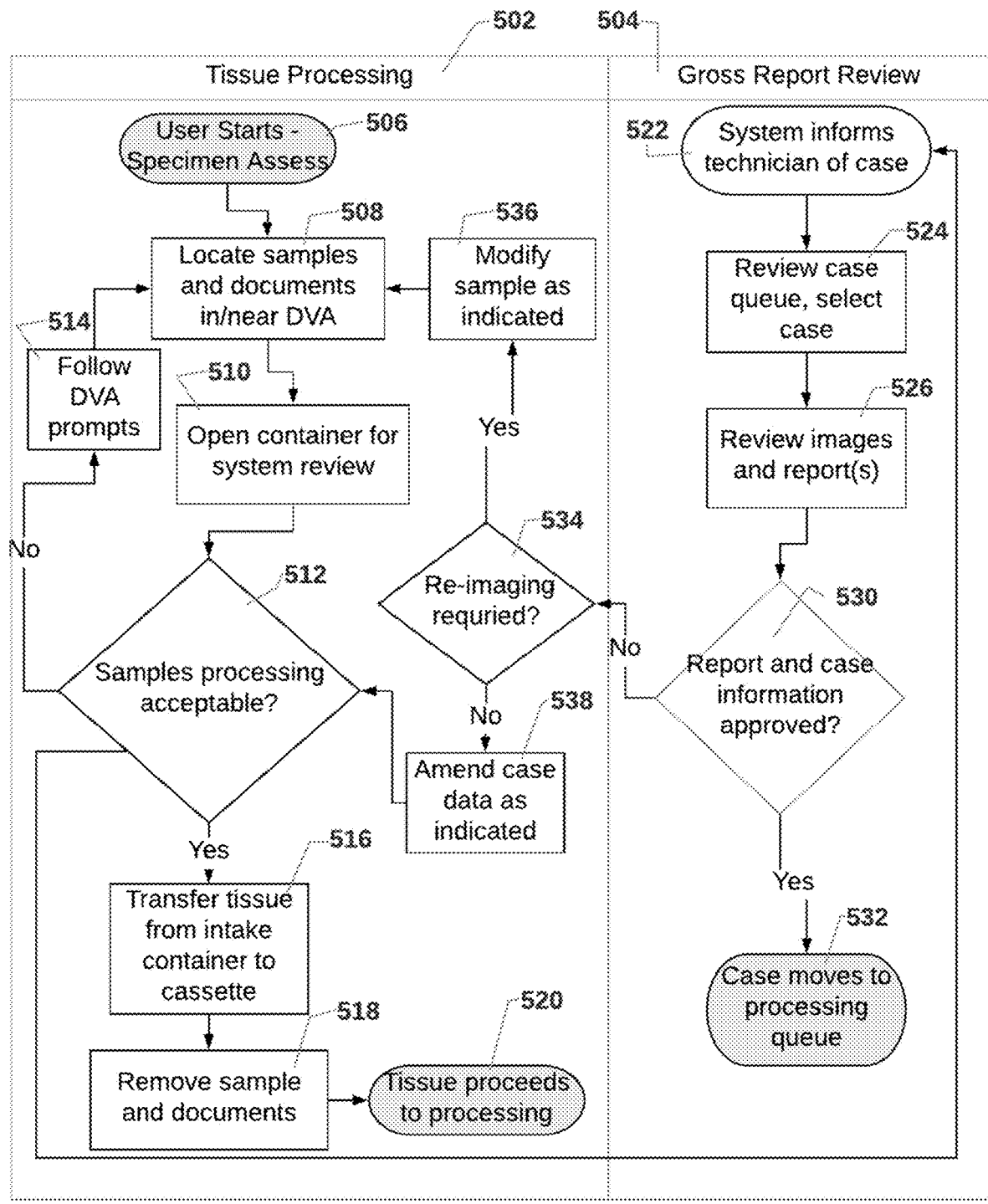
FIG. 5 is a block diagram showing processes carried out by a technician in using the system of FIG. 3, in accordance with an embodiment of the present invention.

FIG. 5 is a block diagram showing processes carried out by a technician in using the system of FIG. 3 in accordance with an embodiment of the present invention. In this embodiment users perform two separate processes tissue processing 502 and gross report review 504, shown respectively in the first and second columns of this figure. For tissue processing 502, the user starts the assessment of the specimen 506 by placing materials inside and in the staging area of the current embodiment of the invention 508. If specimens are in closed intake containers, the user will remove the top of said container to allow for system review 510. The user will then be presented with a display of images of the specimens under assessment (via a user interface or UI), as well as a report describing the specimens and verification that all material, including labels and paperwork, are associated with the correct patient record. The user will assess the acceptability of this information 512. If the user finds this information unacceptable as presented, then the system will provide options for the technician to adjust and modify the information and imagery 514. This may include but is not limited to modification of the lighting and computer vision analysis of the specimens and modification of the descriptive report, among other possibilities. If the specimen processing is considered acceptable by the technician 512, then the user will transfer the specimens from the intake container to the processing cassette 516. This process is described further in connection with FIG. 17. The user then removes the specimen and associated documents from the DVA 518. Additional processing of the specimens, outside the scope of this embodiment of the invention 520 then occurs.

This embodiment of the invention will also at this point inform a technician 522 that this specimen (case) is available for review and potentially for approval using the gross report review components 504. The technicians may select one case available for review from the list (queue) 524; the technicians will then review the images and other data for said case 526. If the case report and associated information is acceptable to the user (technician) 530 they will note their approval using the supplied UI, and the case will be moved to a separate queue for downstream processing 532. If the case report and associated information are not acceptable, then the user, will follow supplied prompts associated with the tissue processing workflow 502. If a new image of the specimen is required 534, then the user for this process will be directed through options for modifying and/or correcting the image capture 536. If a new image is not required, then the user will be directed through various options for modifying and/or correcting additional information associated with this specimen 538. Revised specimen processing information will be re-assessed as part of the tissue processing workflow 512 then resent to the queue for the gross report review process 504.

Figure 6:
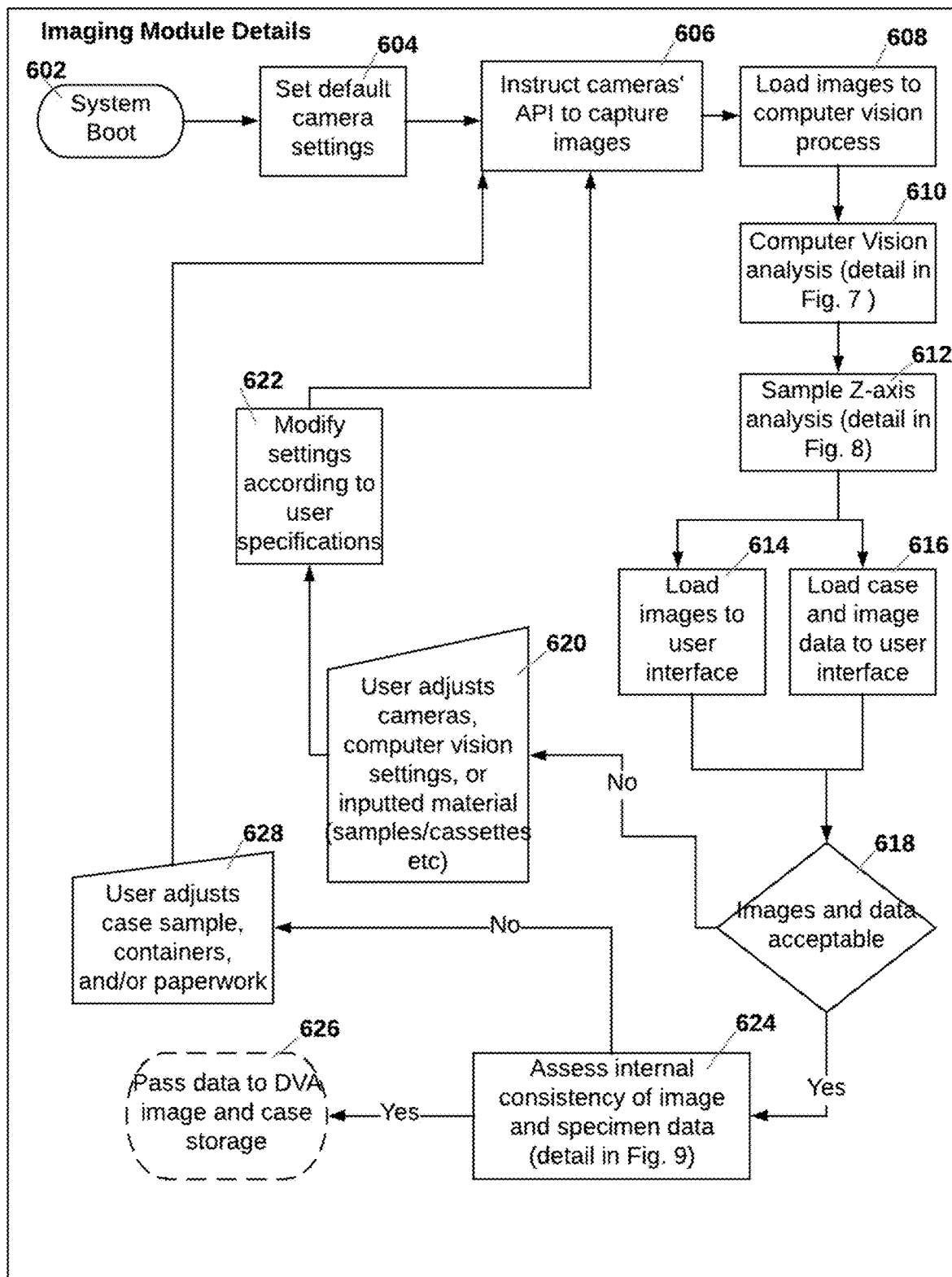
FIG. 6 is a block diagram showing the processes carried out by the imaging module of FIG. 3, in accordance with an embodiment of the present invention.

FIG. 6 is a block diagram showing the processes carried out by the imaging module of FIG. 3, in accordance with an embodiment of the present invention. When prompted by the user, these software processes initialize the imaging module and cause loading of required software libraries (i.e. system boot) 602. An initialization (.ini) file is then loaded that provides default setting values for the camera hardware application programming interface (API) to define settings for the camera hardware as well as default settings for the computer vision pipeline 604. The cameras next capture images of the specimens 606, including the labels and barcodes, and pass those images to the computer vision pipeline 608. The computer vision analysis identifies and generates a description of individual specimens 610, described in greater detail in connection with FIG. 7. The z-axis calculation processes determine the z-axis dimensions (height) of a specimen via stereoscopic sensing 612 further described in connection with FIG. 8. The data from this image analysis is then loaded to the user interface 614 and 616. The user then views the images and the text showing the analysis performed by the computer vision pipeline, including but not limited to the dimensions, count, and color of the specimens. The user then assesses if the images and data are acceptable 618. If the images and related analysis are not acceptable, the user adjusts the computer vision settings and/or the inputted materials (specimens, documents, etc.) 620. The imaging module then modifies system settings to match these modifications 622, and the system instructs the cameras to capture images for subsequent analysis. If information supplied in 614 and 616 is acceptable (yes), a quality assurance process analyzes the text generated from images of materials (for example documents, processing cassette, intake containers and any labeling affixed to those materials) to ascertain if all this information is internally consistent (i.e. sample and containers used are associated with the correct patient and the patients electronic records) 624. If all relevant data is consistent, it is aggregated and passed to the DVA image and case storage database 626 (this storage system is the same as FIG. 4 process 420). If this data is not internally consistent, the user must modify the relevant containers, labels, and/or documents 628, then the imaging module will instruct the cameras to capture new images of the specimens and associated containers 606. These quality assurance processes are described in greater detail in FIG. 9.

Figure 7:
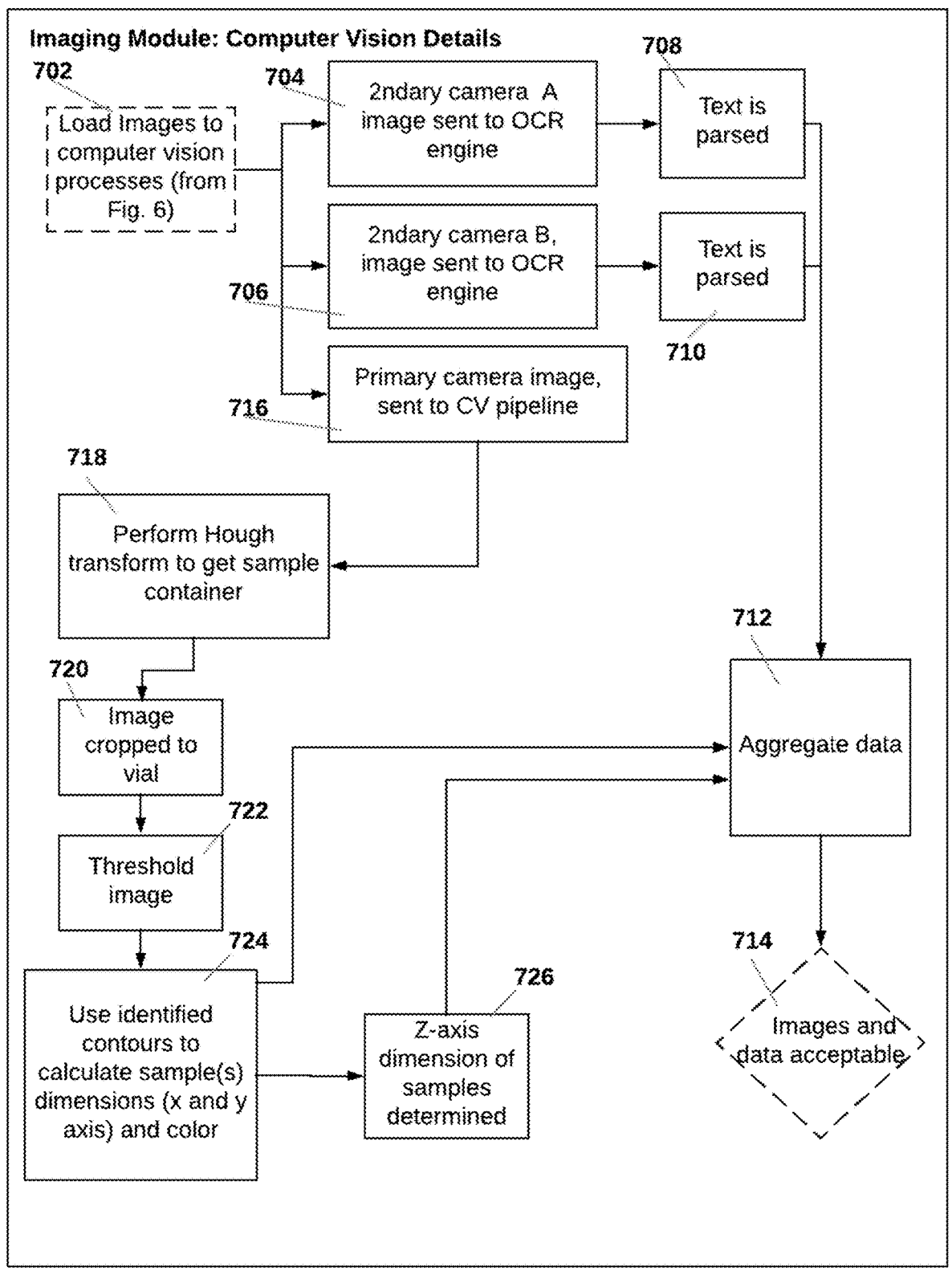
FIG. 7 is a block diagram showing the processes associated with computer vision processes for the imaging module of FIG. 3, in accordance with an embodiment of the present invention.

FIG. 7 is a block diagram showing the processes associated with computer vision processes for the imaging module of FIG. 3, in accordance with an embodiment of the present invention. This computer vision analysis identifies and generates a description of specimens imaged from the device cameras (initially described in FIG. 6 process 610). From the imaging module processes, the device cameras images are sent to these computer vision processes 702. The two images from the auxiliary cameras may contain text-containing components such as a requisition, cassette, and various labeling affixed to those materials, and are sent to an optical character recognition (OCR) engine to extract meaningful text; processing occurs for both secondary camera A 704 and secondary camera B 706. Using, for example, OpenCv's text recognition capabilities, text is identified from the supplied images and translated into text fields (patient name, date of birth, etc.) processing occurs for both secondary camera A 708 and secondary camera B 710. In process 712 this data is then aggregated and then presented to the user for their assessment 714 (initially described in connection with FIG. 6 process 618).

In addition to the processing described in this figure, images from the primary camera, which may contain an image of a vial containing tissue specimens contained therein, is sent to the CV (computer vision) pipeline 716. Through a series of processes, the CV pipeline identifies, or segments, the tissue specimens from the background of the image. First, in this embodiment of the invention, the Hough transform is used to isolate the intake container location from the rest of the image 718. The image is then cropped to only show the intake container 720. This cropped image is processed to identify the subset of the image where the specimen is located (known as thresholding) 722. In this embodiment, bilevel thresholding is used but other approaches are possible. The extracted contours can be used to calculate the x and y dimensions of the tissue specimens, using the pixel to millimeter conversion appropriate to this embodiment of the invention 724. The color of the specimen is determined by taking the mean of the RGB values within the extracted contour and comparing this to a series of manually defined color bins 724. The extracted contours are then sent for additional processing to determine the z-axis dimension (vertical dimension) 726 (described in more detail in connection with FIG. 8). The data generated from these processes, including but not limited to the specimen contour locations, dimensions, and colors, is then aggregated 712 for assessment by the user 714, as initially described in connection with FIG. 6 process 618.

Figure 8:
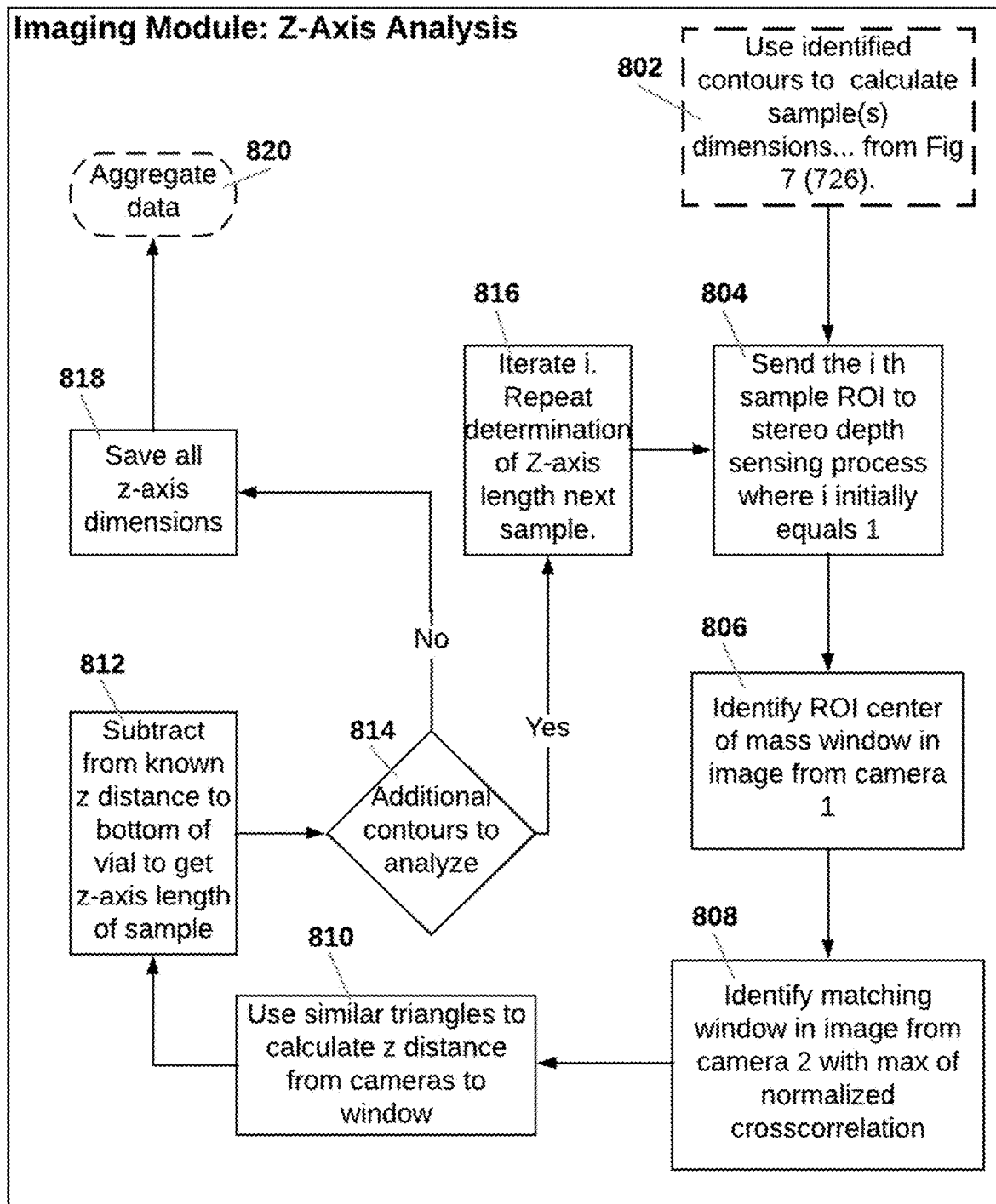
FIG. 8 is a block diagram showing the processes associated with the z-axis analysis for the imaging module of FIG. 3, in accordance with an embodiment of the present invention.

FIG. 8 is a block diagram showing the processes associated with the z-axis analysis for the imaging module of FIG. 3, in accordance with an embodiment of the present invention. In particular, this figure further explains the processes required to determine the z-axis dimension of the tissue specimens identified with the segmentation processes via stereoscopic sensing as described in connection with FIG. 7 process 726. This series of processes begin when the identified tissue specimen contours and location, within the device supplied image, are received 802. These contours and locations may also be described as a Region of Interest (ROI) for an image, as is done here. As noted in connection with FIG. 1, for this process a DUO-MINILX-LV1 stereoscopic camera is used, which contains two cameras ("camera 1" and "camera 2"), set at a known distance from each other. This ROI data, the ith sample ROI, is sent to the first of the two stereo camera for analysis 804. The location of a feature point representing the likely maximum height point of the specimen, in this case the center of mass of the ROI of the i-th tissue specimen, is identified from the perspective of the first camera within the stereo camera setup 806. The same feature point is then identified from the perspective of the second camera within the stereo camera setup 808 by finding the maximum of the normalized cross correlation of the feature point with the image from the second camera. Next, similar triangles are used to identify the z-axis distance from the stereo camera to the feature point 810. Given a known z-axis distance to the bottom of the vial from the stereo camera and the assumption that the tissue specimens will settle at the bottom of the vial, the z-axis dimension of the i-th specimen is calculated 812. If there are additional specimen contours for analysis 814 then this process is repeated until the z dimensions for all the identified tissue specimens have been found 816. All relevant data is then saved 818 and aggregated with the other specimen data 820 including the x-axis and y-axis dimensions, the color of the tissue specimens, the text parsed by the OCR engine, and the original images from the cameras, and passed to the quality control process described in connection with FIG. 9.

Figure 9:
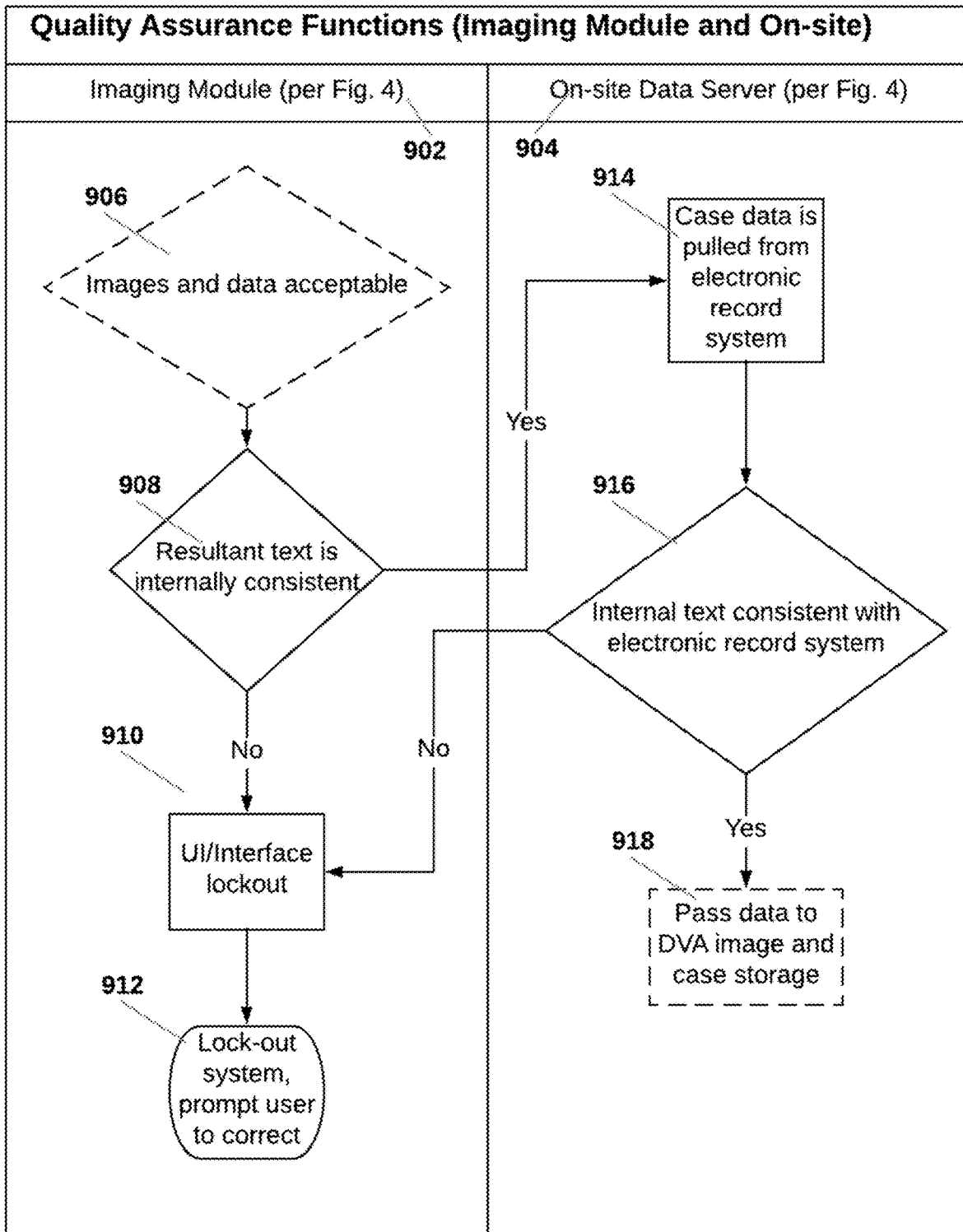
FIG. 9 is a block diagram showing the processes associated with quality assurance functions for the imaging module of FIG. 3, in accordance with an embodiment of the present invention.

FIG. 9 is a block diagram showing the processes associated with quality assurance functions for the imaging module of FIG. 3, in accordance with an embodiment of the present invention. These elements take as input aggregated data accumulated through the imaging module of images and related data which has been assessed by the user, as initially described in connection with FIG. 6 process 618. Also, the processes described in this figure represent further detail on the process of assessing "Correct sample and container used" initially described in connection with FIG. 6 process 624 (represented here as process 906). Using these images deemed acceptable by the user, this quality assurance function compares the text fields parsed from the invention's cameras' processed images, including information such as the patient's name and date of birth 908. If the text data gathered from these cameras is not consistent, the system will lock the user interface (UI) to prevent further specimen processing 910 and prompt the user to take corrective action 912. The user can address the inconsistency and restart the imaging module from the system boot process in FIG. 6. Notably, all these processes occur within the imaging module 902. If the resultant text is internally consistent, the aggregated data is passed to the DVA image and case storage within the on-site data server 904. This data is then compared, based on the same criteria, with case information stored in the users' electronic record system 914. The internal consistency of this data is then assessed again 916. If the relevant text and additional data is internally consistent then the data is sent to the DVA image and case storage database with this assessment of data consistency logged 918. If this data is not internally consistent, then the user interface (UI) is again locked out 910 and the user is prompted to correct the conflict 912. Through all these processes, the internal consistency of the data under inspection is communicated to the user by showing a checkmark symbol on the relevant user interface (UI). While the quality assurance process described here is done once at the end of the imaging module, in other embodiments of the invention it could be done multiple times throughout the specimen processing steps.

Figure 10:
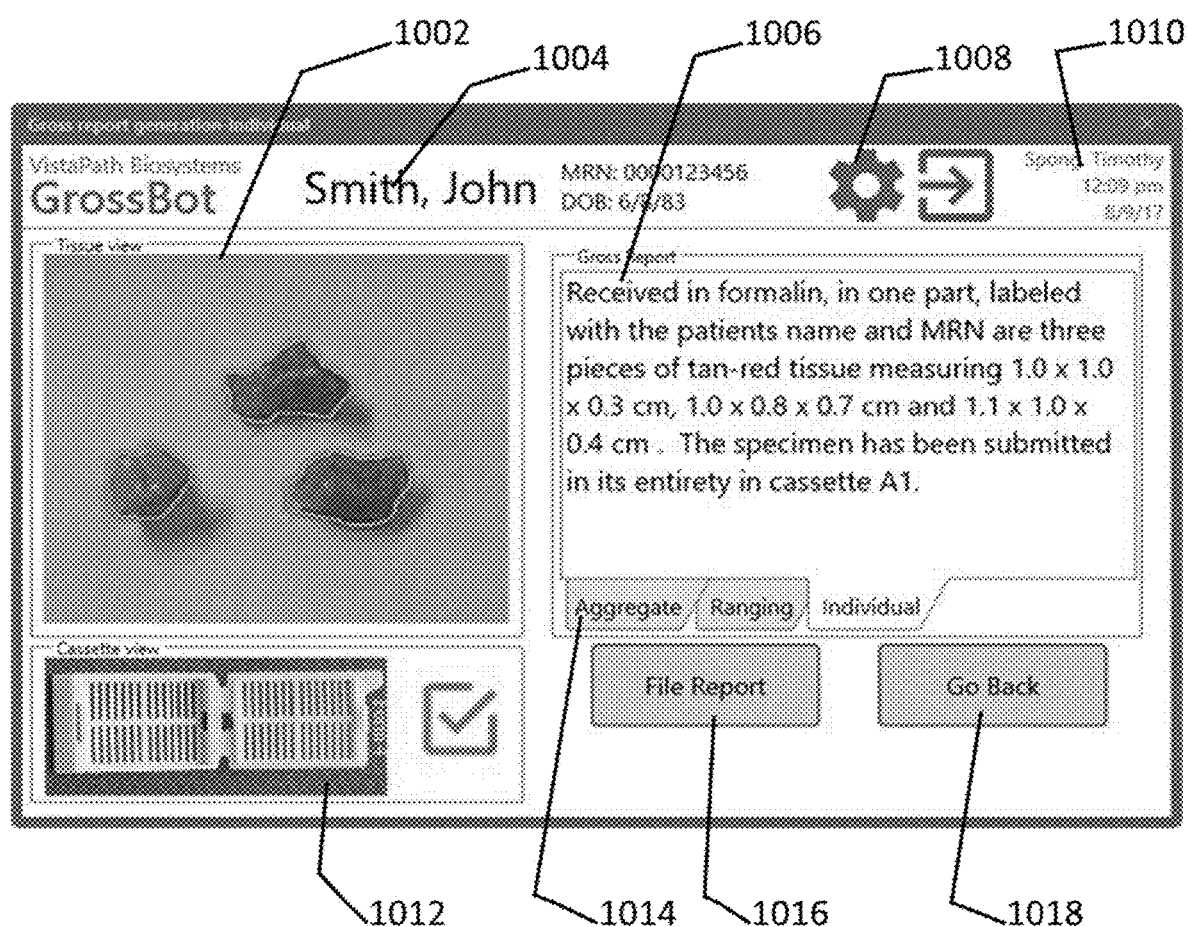
FIG. 10 is a representation of a display providing a user interface for the imaging module of FIG. 3 in accordance with an embodiment of the present invention.

FIG. 10 is a representation of a display providing a user interface (UI) for the imaging module 304 of FIG. 3 in accordance with an embodiment of the present invention. This interface allows a user to assess output from the specimen imaging and report generation, with the intent of assessing accuracy of the specimen assessment process. Final approval of the specimen processing may be made in a separate step as described in connection with FIG. 11. In this embodiment this separation of user actions allows users of lower levels of training and certification to process the specimens and assess the success of said processing, while final approval of the gross report may be performed by a technician with higher levels of certification, without needing to be co-located with said specimen(s). The case information 1004 including the patient name, medical record number (MRN), and date of birth (DOB), is shown for user review. The user identification 1010, in this embodiment the user's name and time of use, is shown to confirm the correct user is associated with the specimen processing. Viewing settings, among other options, may be modified by the user by pressing the graphical selector indicated by the 'gear' icon 1008.

This user interface displays a number of images with various associated information. Process 1002 is an image of the specimen(s) for the given case. A description of the specimen 1006, also called the "gross report" in this embodiment of the invention, is presented for user review. This text, generated from the computer vision pipeline, should make an accurate description of the specimen represented in the images 1002; this is one of a number of criteria by which the user may assess this information and choose to file the report for approval, or go back to other processes to modify the images or related information (as initially described in connection with FIG. 6). In this embodiment, if the user wants to display this descriptive report in a different template and/or format, changes of this type may be made by selecting various graphical tabs 1014. To show the user that all containers, labels, and other textual information are associated with the current case, this user interface shows an image and marks it with an icon of a check mark 1012 to indicate the assessed data is internally consistent, as described in connection with FIG. 9. In this embodiment the processing cassette is assessed for said inclusion; in other embodiments paperwork and other labelling associated with a given case would be included in this assessment. If the information as presented is acceptable, the user can indicate this decision by pressing the "File Report" graphical selector 1016. If this information is unacceptable the user may press the "Go Back"' graphical selector 1018. The user will then be presented with a series of options to modify the current report, as described initially in FIG. 6.

Figure 11:
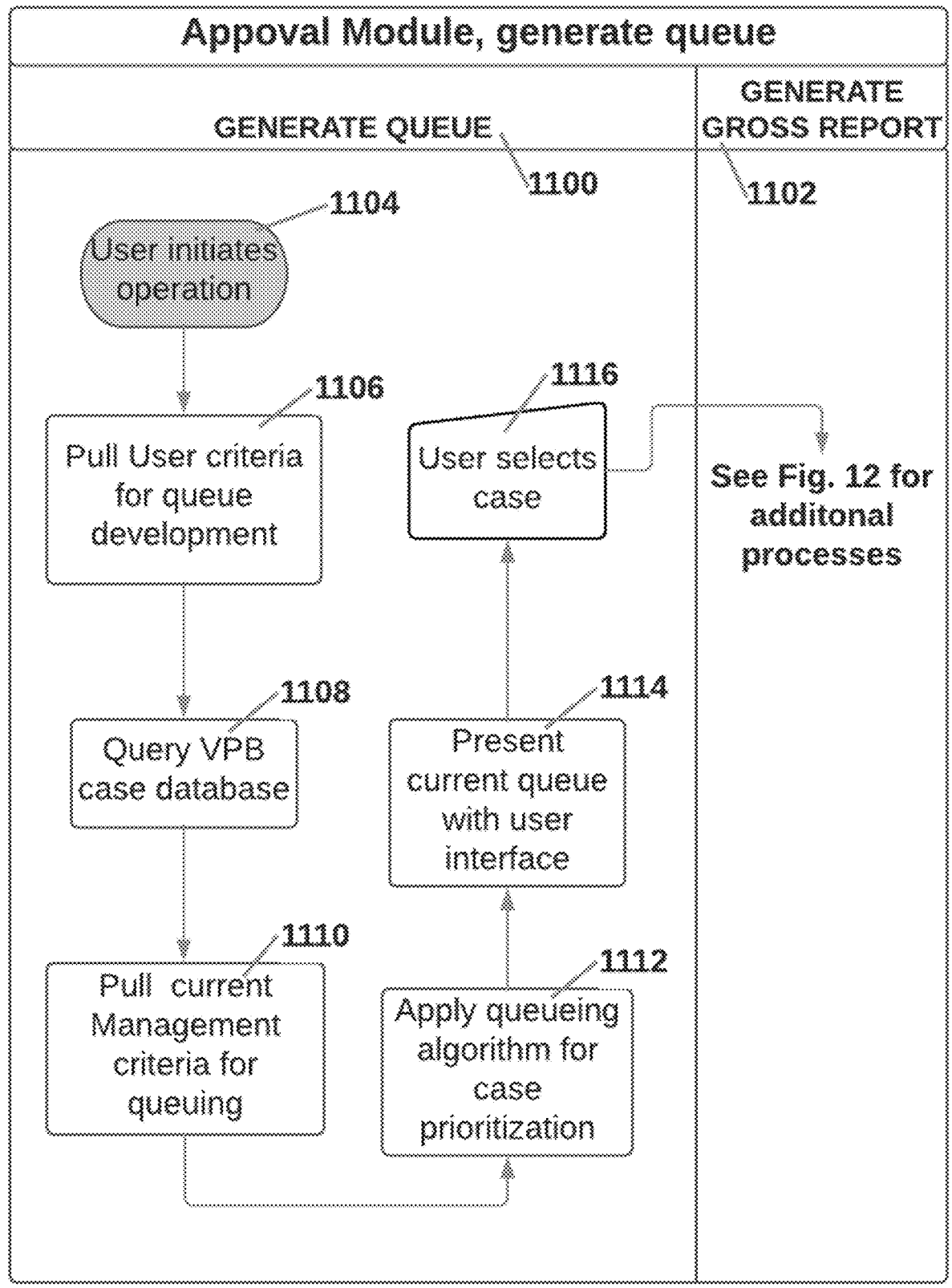
FIG. 11 is a block diagram showing the processes carried out by the approval module of FIG. 3, in accordance with an embodiment of the present invention.

FIG. 11 is a block diagram showing the processes carried out by the approval module of FIG. 3, in accordance with an embodiment of the present invention. As initially described in connection with FIG. 4 process 406, the approval module allows for the review, modification, and potential approval of the specimen assessment. Following is a more detailed description of the logical flow for the queue generation of this module.

The user will initiate the approval module processes via a user interface 1104. The module will then access current priority criteria for the active user 1106. The system then queries the DVA case and image storage on the VPB Data server (initially described in connection with FIG. 4) to identify available cases for assessment. Additional priority criteria, user-entered via the management module and stored in the DVA case and image storage (initially described in connection with FIG. 4 process 426) will then be accessed 1110. Based on this data, an appropriate queue will be developed for the user 1112. The development of said priority queue may include such criteria as specimen type, time of entry into lab system, and requirements for processing, among other criteria. One of a number of common queueing algorithms may be applied here to develop said prioritization. This queue is then presented to the user with a user interface 1114 after which the user may select a case for review 1116. The selected case will then be sent to additional processes for this approval module to generate a gross report 1102, as described in connection with FIG. 12.

Figure 12:
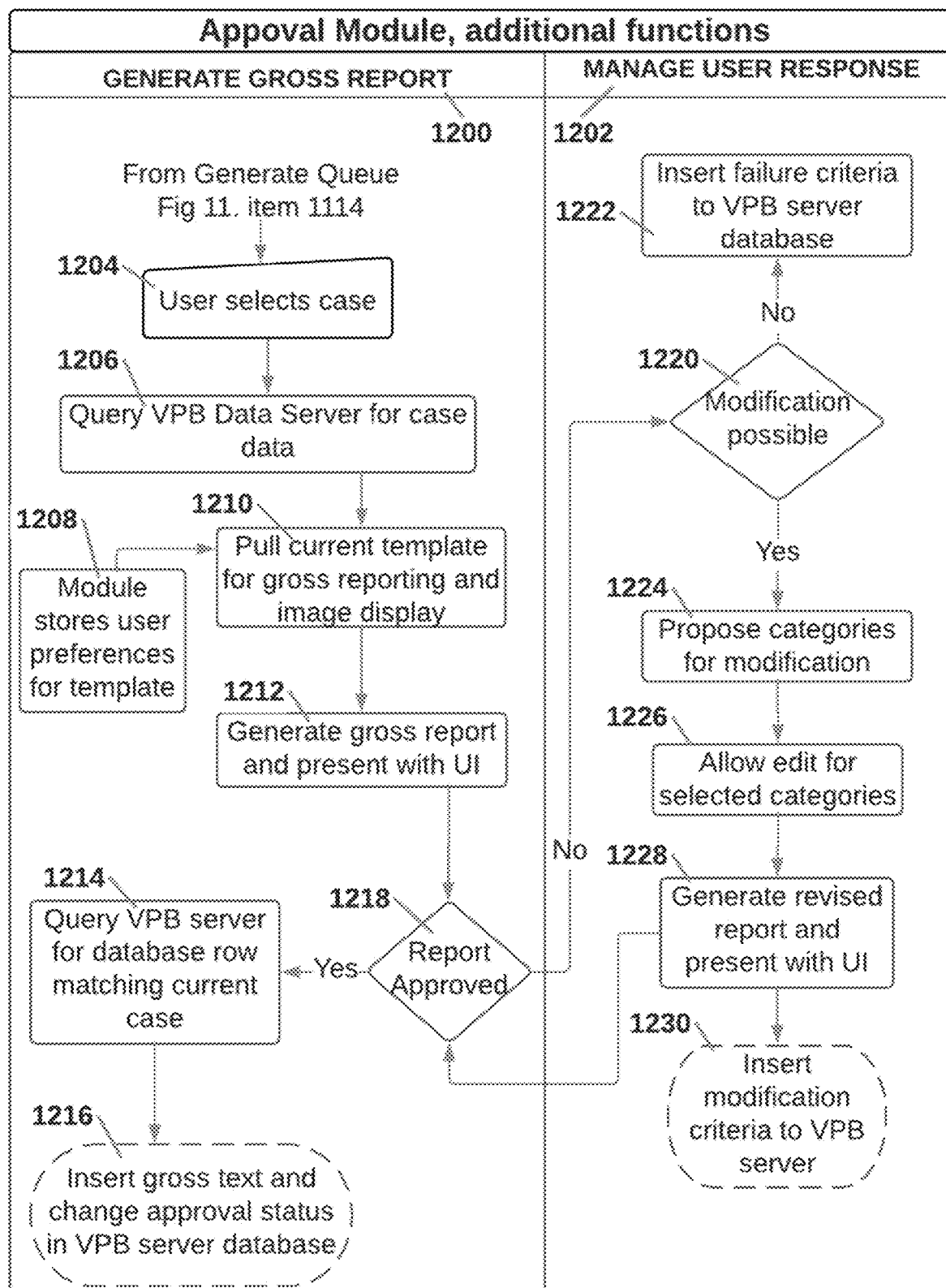
FIG. 12 is a block diagram showing additional processes carried out by the approval module of FIG. 3, in accordance with an embodiment of the present invention.

FIG. 12 is a block diagram showing additional processes carried out by the approval module of FIG. 3, in accordance with an embodiment of the present invention. In particular, this figure describes the generation and viewing of the gross report 1200 and presentation of said report to the user for assessment and possible approval 1202. Once a case is selected from the case queue (as described in FIG. 11 process 1116 (and shown again here for continuity 1204), the processes to generate a gross report begins. The VPB data server (originally described in connection with FIG. 4 process 404) is queried to pull image and text data for the selected case 1206. The user defined template for the gross report is then pulled 1210. This template may include the type and location of data for display; the preferences for this template may be entered by users with appropriate approvals 1208 and stored in the VPB data server. The approval module will then generate an appropriate UI showing said case data 1212 for user review 1218. If the user accepts this case data as presented, then the VPB data server will be queried for the database row matching this case 1214. Further, the gross report text, as shown to the user, will be entered in this database location, and the status of the report will be changed to "approved" 1216.

If the user does not approve the gross report generated by the approval module 1218 the user will be directed through options to modify or reject said report, as described in the figure column "Manage User Response" 1202. The user will be prompted to decide if the gross report could be modified to make the report acceptable 1220. If no modification is possible that will allow for approval, then the user will enter the criteria for this failure, and their response will be stored in the VPB data server 1222. Such criteria could include issues related to image quality or image interpretation performed by the imaging module, for example. If modification of the gross report may allow for approval of said report, then the approval module will propose categories for the report's modification using a UI 1224. These categories may include the layout of the report, how the dimensions of the tissues are presented, or other possible modifications. A UI will be presented to the user to make such modifications to the report 1226. The revisions to said gross report will be sent to the VPB data server for storage 1230. Then the revisions to the gross report will be generated 1228 and presented to the user for them to determine if the report is acceptable 1218. Based on the user response, the approval module will again prompt the user through the approval processes as described above.

Figure 13:
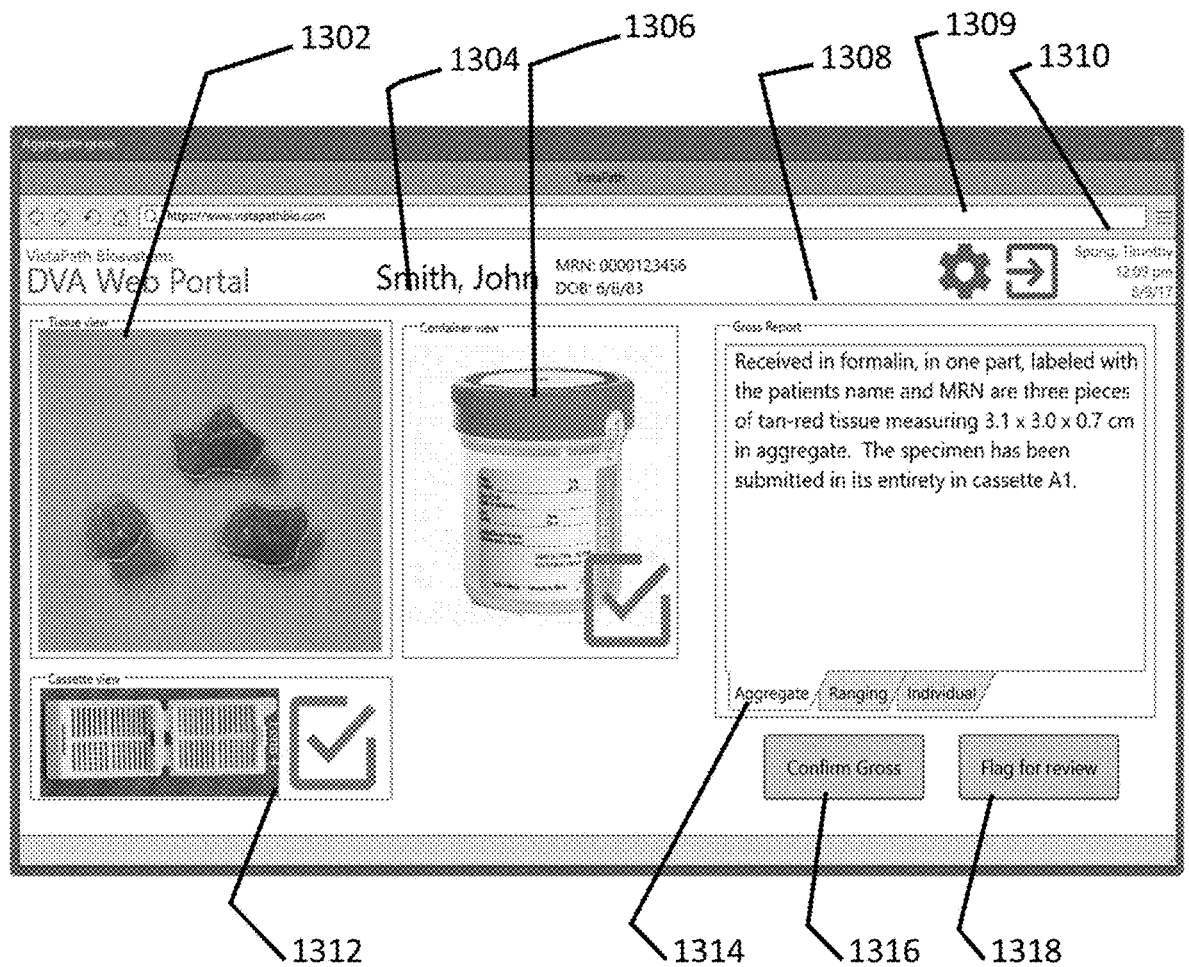
FIG. 13 is a representation of a display providing a user interface for the approval module of FIG. 3, in accordance with an embodiment of the present invention.

FIG. 13 is a representation of a display providing a user interface (UI) for the approval module of FIG. 3, in accordance with an embodiment of the present invention. This interface allows a user to assess the specimen (gross) report and associated data. In this embodiment of the invention, this UI is utilized by qualified users to make a final approval of the image and text report associated with said specimens. The case information such as patient name, medical record number (MRN), and date of birth (DOB), is shown for user review 1304. The user identification 1310, in this case the user's name and time of use, is shown to confirm the correct user is associated with the specimen report review. The user may view and modifying settings, among other options, by pressing the graphical selector indicated by the 'gear' icon 1309.

The user interface in FIG. 13 displays a number of images with various associated information. Process 1302 shows an image of the specimen(s) for a given case. A description of the specimens (the gross report) 1308 is also shown. This information generated by the imaging module is a text description of the specimens represented in the image(s) 1302; this is one of a number of criteria by which the user may assess this output and choose to confirm or flag this information. If the user wants to display this descriptive report with a different template and/or format, changes of this type may be made by selecting one of the appropriate tabs 1314. To show the user that all containers labels and other textual information is associated with the current case, the user interface shows two images and marks them with an icon of a check mark to indicate inclusion in the correct case as initially described in connection with FIG. 4. In this embodiment the UI shows the intake container 1306 and the processing cassette 1312 and displays a checkmark icon if the information is internally consistent. If the information as presented in this UI is acceptable, the user can indicate this decision by clicking the "Confirm Gross" graphical selector 1316. If this information is unacceptable, the user may click the "Flag for review" graphical selector 1318. The user will then be presented with a series of options to describe the problems associated with the current report, initially described in connection with FIG. 12.

Figure 14:
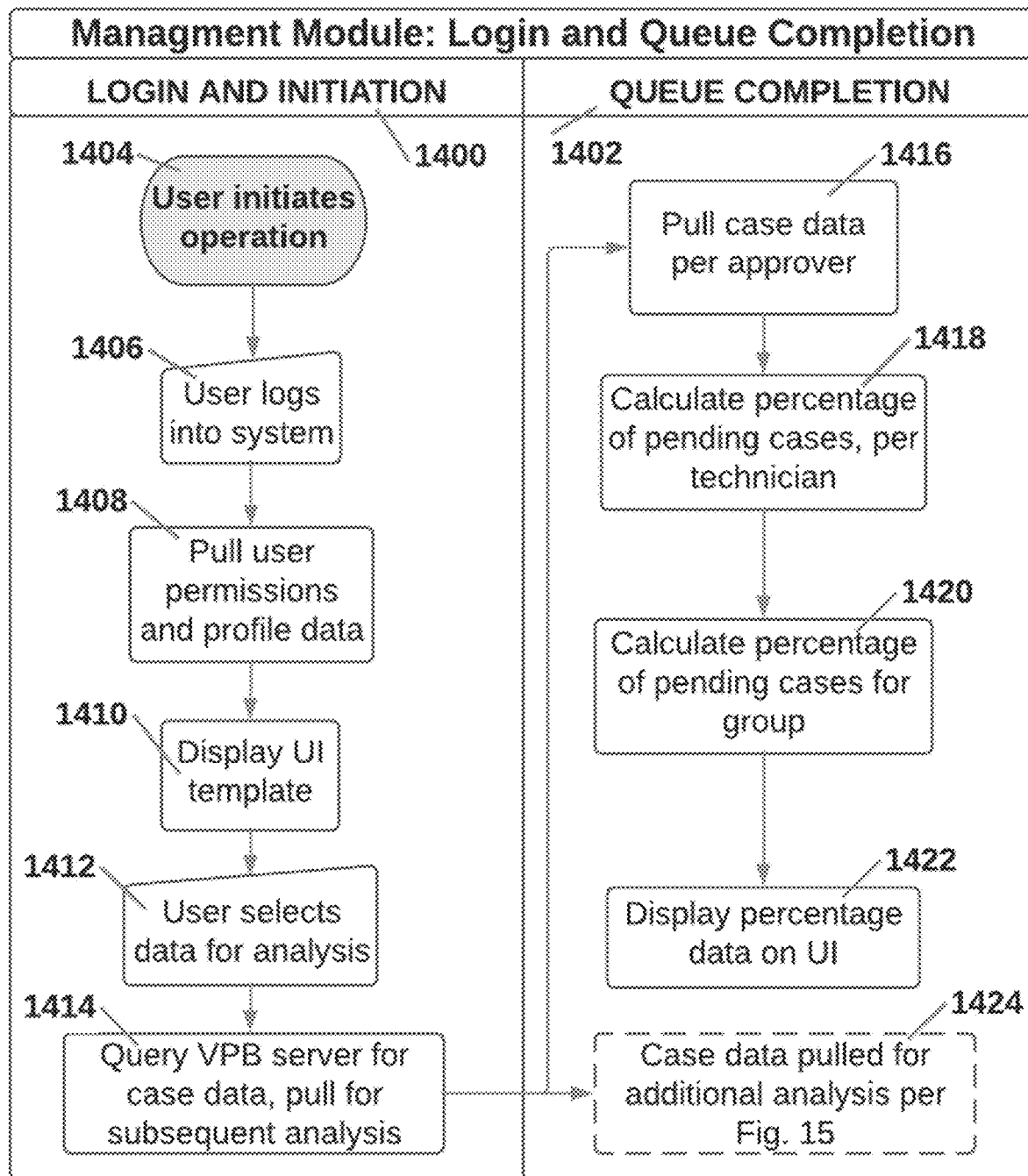
FIG. 14 is a block diagram showing the processes carried out by the management module of FIG. 3, in accordance with an embodiment of the present invention.

FIG. 14 is a block diagram showing the processes carried out by the management module of FIG. 3, in accordance with an embodiment of the present invention. The management module aggregates operational and image data for review of various aspects of this process and informs users on relevant information regarding the specimens. In particular, this figure describes the processes for management module initiation 1400, and analysis of completion of the case queue 1402.

The management module is initiated by the user 1404 then the user logs into the system 1406. The module pulls the permissions and user profile for the given login 1408 and displays an initial UI (user interface as further described FIG. 16) with information displayed in accordance to the user's permissions 1410. The user selects the category of information of interest for analysis 1412. The module then queries the VPB data server to pull relevant data for analysis 1414. This data is made available for the queue completion 1402 described here, as well as additional analysis 1424 described in connection with FIG. 15. To analyze the percent of the queue that has been completed, this module pulls data for the total queue and data for which cases have been completed 1416. The percentage of cases pending for each technician, versus the total queue for said technician is then calculated 1418. The percentage of cases pending for a given group, versus the total queue for said group, is then calculated 1420. This group may be defined as one process step or a given laboratory, for example. This module then displays these analyses for the user 1422. In other embodiments of the invention, representations of this analysis may be printed or otherwise stored for later review.

Figure 15:
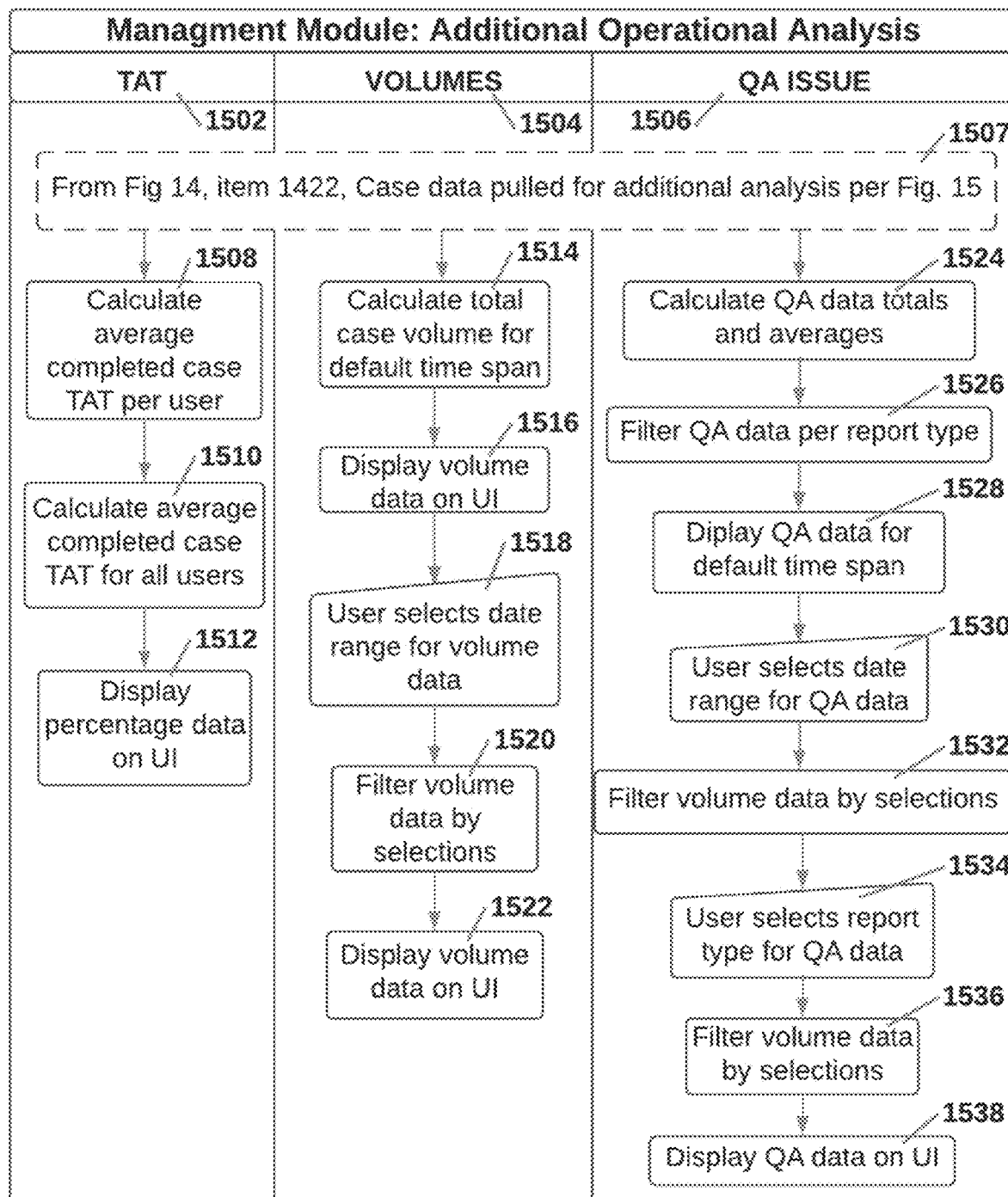
FIG. 15 is a block diagram showing additional processes associated with the management module of FIG. 3, in accordance with an embodiment of the present invention.

FIG. 15 is a block diagram showing additional processes carried out by the management module of FIG. 3, in accordance with an embodiment of the present invention. The management module aggregates operational and image data for assessment of various aspects of this process and informing users on relevant information regarding the specimens. In particular, this figure describes additional analysis provided to the user for their assessment of operational performance. As described in connection with FIG. 14, relevant data is pulled from the VPB data server for analyses described in connection with FIG. 14 as well as analyses described here in process 1507. For an analysis of the case turnaround time (abbreviated here TAT) 1502, this process time is averaged for each user 15008, as well as for all users 1510. These averages are then displayed for user review 1512. For the user to assess case volumes for a given timeframe 1504 the data made available from process 1507 is used to calculate a total case volume for a default time frame 1514. This calculated data is displayed for user review 1516. The user may then select different time/date ranges used to calculate total case volume 1518. This module will recalculate said totals based on this new time range 1520 and present said analysis for user review 1522. In other embodiments of the invention, various graphs and other visualization tools may be generated to support user review of this and other information.

Analysis of errors, or other quality concerns, is generated by the processes described in the QA (quality assurance) Issue column 1506. As noted in connection with FIG. 14, relevant data is pulled from the VPB data server, for analyses described in connection with FIG. 14 as well as analyses described here, process 1507. For this analysis, error rates will be used to calculate total and average errors 1524. These averages and totals may be filtered by type (of error for example) 1526; this analysis is displayed for user review using a default timeframe, 1528. The user may then select a different timeframe for analysis 1530 and the module will filter the relevant data 1532. The user may then select a type of report to summarize desired QA analysis for presentation 1534. This module will then filter and aggregate relevant data 1536 and display this report for user review 1538. In other embodiments of the invention, representations of this analysis may be printed or otherwise stored for later review.

Figure 16:
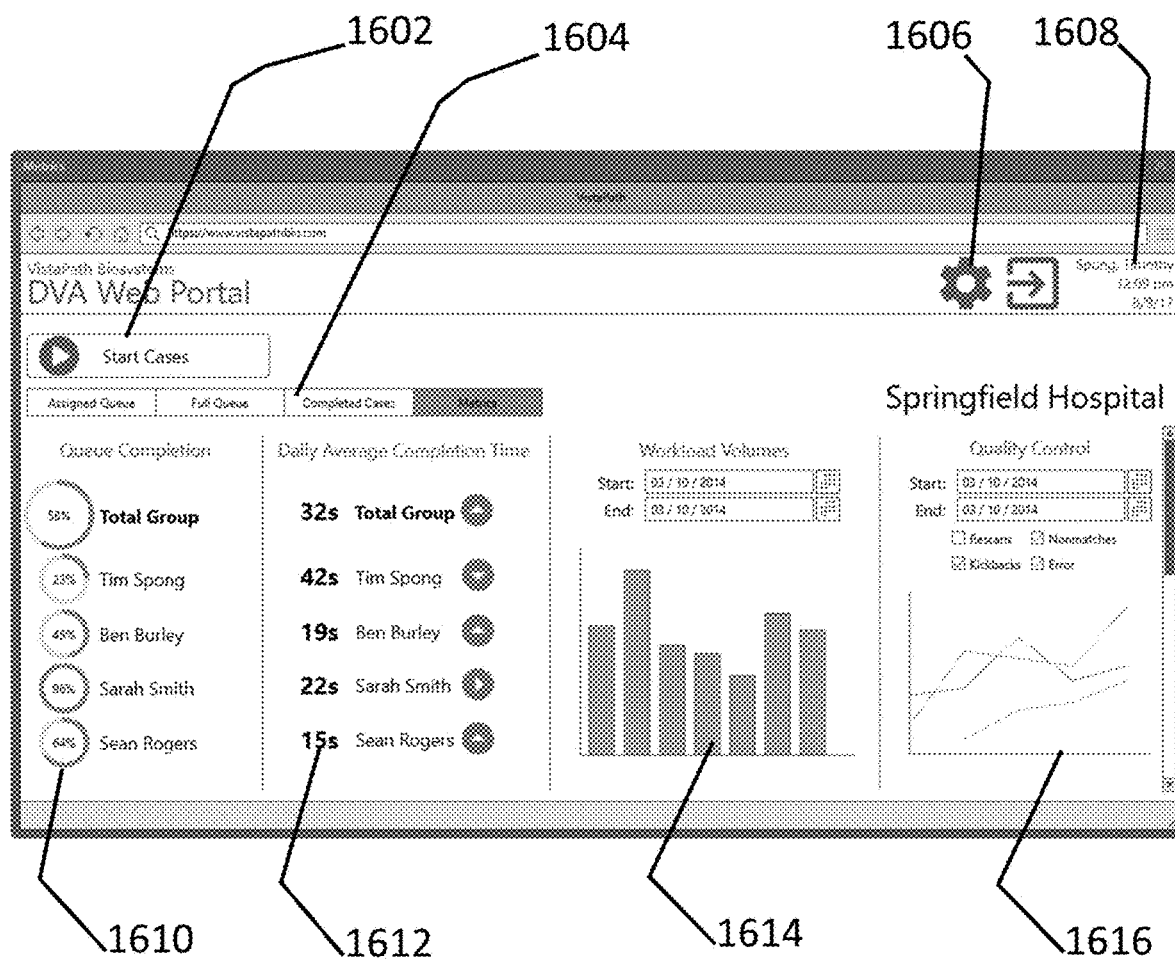
FIG. 16 is a representation of a display providing a user interface (UI) for the management module of FIG. 3 in accordance with an embodiment of the present invention.

FIG. 16 is a representation of a display providing a user interface (UI) for the management module of FIG. 3 in accordance with an embodiment of the present invention. This user interface allows a user to assess the operations of specimen assessment as initially described in connection with FIGS. 14 and 15. This interface can display various work queues, case completion (totals and rates), and other metrics as generated by the management module. The user may select from these information types via the graphical selectors 1604. In the present case, the figure shows use of the "metrics" selector. In addition, various settings may be accessed by pressing the "gear" icon 1606. The user identification 1608, in this embodiment the username and time of use, is shown to confirm a user identity based on their initial login information which determines the data accessible for review. A variety of operational and other data processed by the management module described in connection with FIGS. 14 and 15, are shown in this interface. A table 1610 is displayed showing the percent of specimens completed for a given user's queue. The averages of specimens assessed over a 24-hour period per user are shown in an additional table 1612. Specimen volumes processed in a given time range is also displayed as a bar graph 1614; the date range and other criteria to filter this data are displayed here for user selection. An additional graph 1616 indicates the percentage or count of errors over a selected time period. This QA analysis (described in connection with FIG. 15) may be presented for each technician, overall for the lab, or for a given process steps where the errors occurred. The user may return to other processes, such as individual specimen assessment or approval, by pressing the start cases graphical selector 1602.

Figure 17:
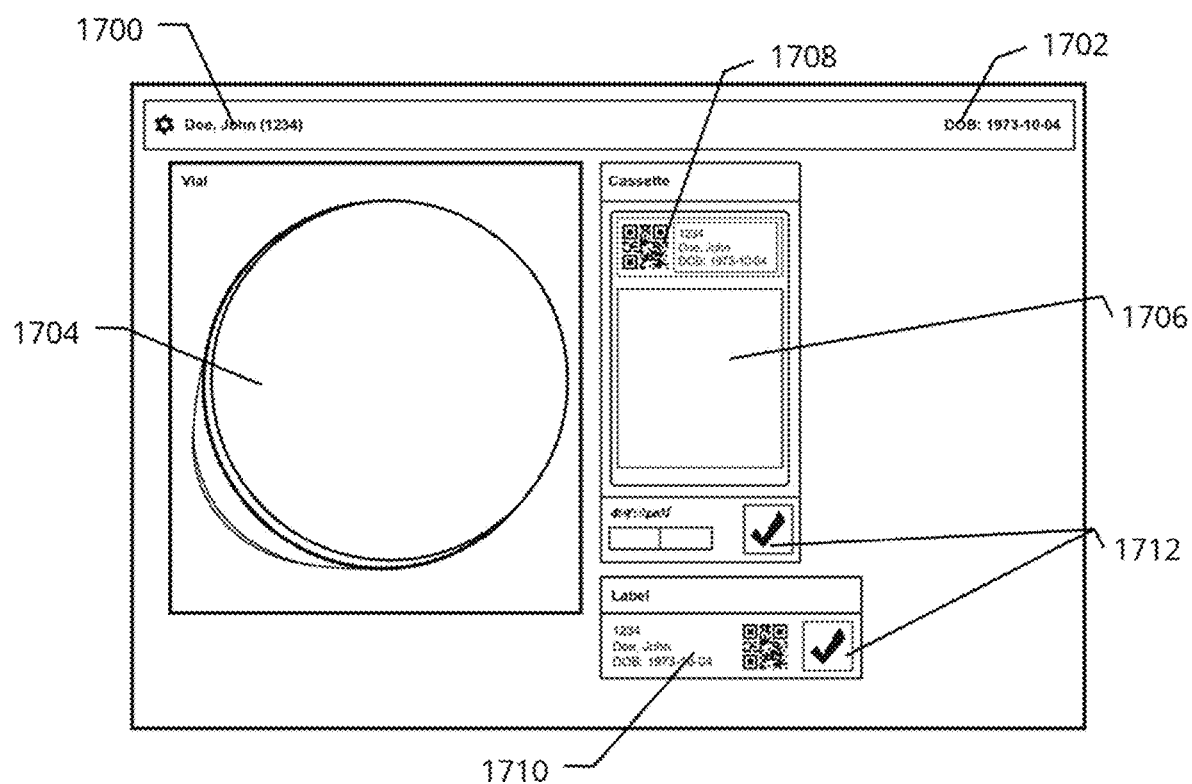
FIG. 17 is a representation of a display providing a user interface for a first step in the transfer of sample pieces from an intake container (shown initially as container 120 in FIG. 1) to a processing cassette (shown initially as cassette 122 in FIG. 1) in accordance with an embodiment of the present invention.

FIG. 17 is a representation of a display providing a user interface for a first step in the transfer of sample pieces from an intake container (shown initially as container 120 in FIG. 1) to a processing cassette (shown initially as cassette 122 in FIG. 1) in accordance with an embodiment of the present invention. The process described here is an expansion of the process for (tissue) sample transfer first described in connection with FIG. 5. The identifying data for the sample, in this case the patient name 1700 and date of birth 1702, are shown respectively in the top left and right of the display in FIG. 17. A top view image of the intake container 1704 is shown here; in this step the container has a screw-top in place. In addition to this top view image of the intake container, an image of any labeling 1710, including barcodes, etc., affixed to the intake container is shown. A top view image of the processing cassette 1706 is also shown in FIG. 17; this image further includes any identifying text and/or barcoding 1708. As described in connection with FIG. 9, this embodiment of the invention compares the identifying data imaged here from the intake container and the processing cassette and compares this information internally and with the case and sample information stored in the LIS to assess internal consistency. If the information items 1708 and 1710 are determined to be consistent with each other and with data in the LIS, then checkmark symbols 1712 are displayed on this user interface. If one or more of the identifying sets of information is not consistent, an x-mark symbol will be displayed, and the user will be prompted to make correction(s) to the set-up prior to continuing, as described in connection with FIG. 9. When this identifying information is consistent, the user may continue with additional steps to transfer sample pieces from the intake container to the processing cassette as described in connection with FIG. 18.

Figure 18:
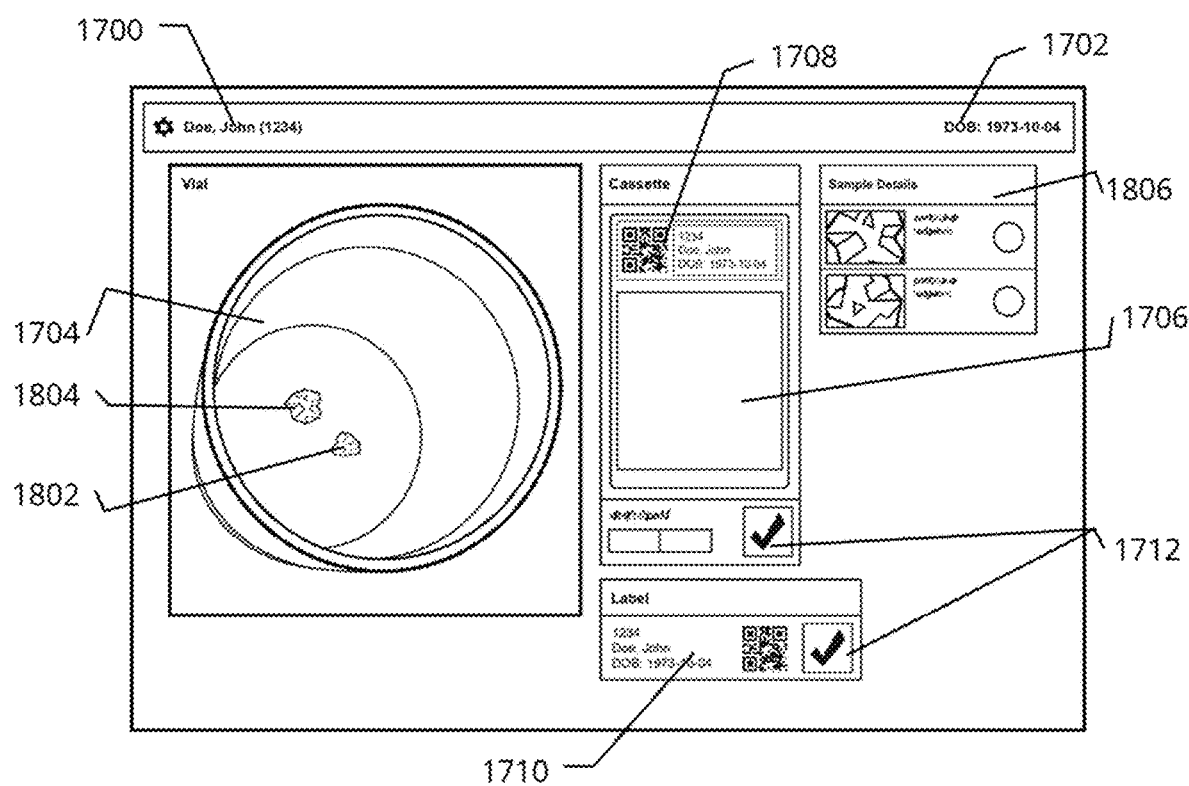
FIG. 18 is a representation of a display providing a user interface for a second step in the transfer of sample pieces from an intake container to a processing cassette in accordance with an embodiment of the present invention.

FIG. 18 is a representation of a display providing a user interface for a second step in the transfer of sample pieces from an intake container to a processing cassette in accordance with an embodiment of the present invention. As described in connection with FIG. 17, when checkmark symbols 1712 are displayed on this user interface, the user may continue the transfer of sample pieces, specifically by removing the top of the intake container shown in the image 1704. In FIG. 18, the screw-top has been removed and the interior of the intake container is visible in the image 1704; the computer vision components of this embodiment of the invention will then process the top-down image 1704. In this example, two samples 1802 and 1804 are identified by the computer vision components. These samples, as identified by this embodiment of the invention, are displayed as thumbnail images 1806. In addition, these sample images 1802 and 1804 are analyzed by the computer vision components as described in connection with FIG. 6 and the resulting dimensions for each sample piece are also displayed 1806. This display of sample piece images 1806 includes symbols that communicates to the user the locations of a given sample piece. When the sample piece is located in the intake container, a circle is displayed next to the sample piece image. If the user does not agree with the identification of sample pieces as displayed, the user may select the sample piece directly on the user interface. An additional dialog window will be presented to allow for modification of sample piece identification, as described in connection with FIG. 6 item 620. If the user agrees with the identification and locations of the sample pieces as displayed in this user interface, the individual sample pieces may be transferred to the processing cassette, as described in connection with FIG. 19.

Figure 19:
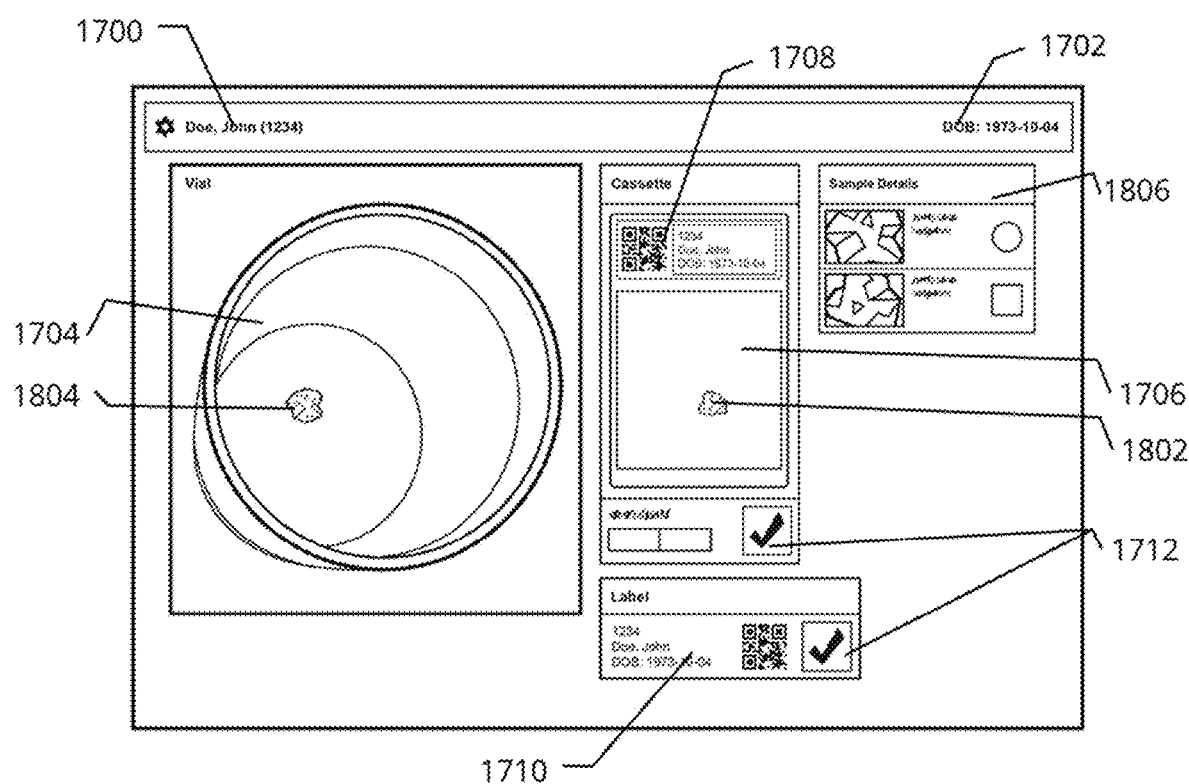
FIG. 19 is a representation of a display providing a user interface for a third step in the transfer of sample pieces from an intake container to a processing cassette in accordance with an embodiment of the present invention.

FIG. 19 is a representation of a display providing a user interface for a third step in the transfer of sample pieces from an intake container to a processing cassette in accordance with an embodiment of the present invention. In this third step in the transfer of sample pieces, the user has physically transferred a sample piece 1802 from the intake container to the processing cassette. Therefore, the image displaying the intake container 1704 shows only a single sample piece 1804 remaining in the container. The image displaying the processing cassette 1706 now shows the sample piece 1802 that the user has transferred from the intake container. In addition, the computer vision components of this embodiment have identified the presence of this tissue as located in the processing cassette. Therefore, the display of sample piece images 1806 now includes a square next to a thumbnail image of this transferred sample piece 1802, to indicate to the user that the piece has been transferred to the processing cassette. If the user does not agree with the identification and location of sample pieces as displayed, the user may select the sample piece directly on the user interface. An additional dialog window will be presented to allow for modification of sample piece identification, as described in connection with FIG. 6 item 620. If the user agrees with the identification and locations of the sample pieces as displayed in this user interface, additional sample pieces may be transferred to the processing cassette, as described in connection with FIG. 20.

Figure 20:
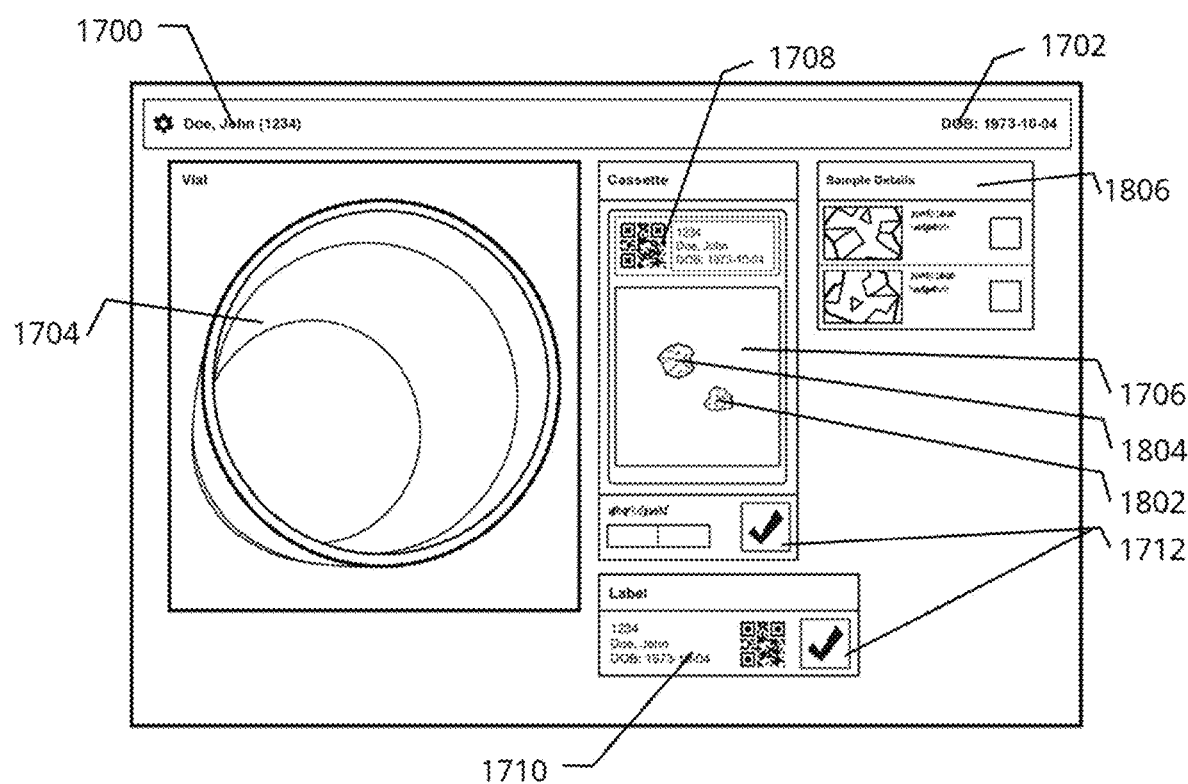
FIG. 20 is a representation of a display providing a user interface for a fourth step in the transfer of sample pieces from an intake container to a processing cassette in accordance with an embodiment of the present invention.

FIG. 20 is a representation of a display providing a user interface for a fourth step in the transfer of sample pieces from an intake container to a processing cassette in accordance with an embodiment of the present invention. In this fourth step in the transfer of sample pieces, the user has physically transferred a second sample piece 1804 from the intake container to the processing cassette. Therefore, the image displaying the intake container 1704 shows no sample pieces visible. The image displaying the processing cassette 1706 now shows both sample pieces 1802 and 1804 as present, since the user has now completed transfer of both sample pieces from the intake container. In addition, the display of thumbnail sample piece images 1806 now shows a square next to both sample piece thumbnail images 1802 and 1804, to indicate to the user that the computer vision components have identified both sample pieces as present in the processing cassette. At the completion of this transfer of sample piece, if the computer vision components identify the same piece count for samples pieces from the initial count of pieces in the intake container the user will be prompted, via a new dialog box shown with the user interface, to confirm this process is complete. If the computer vision components do not identify the same piece count for sample pieces from the initial count of pieces in the intake container, the user will be prompted, via a new dialog box shown with the user interface, to locate any missing or modified sample pieces.

The computer processes carried out in embodiments of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the claims below is also included in the present invention. Likewise, a computer program product including computer executable instructions for executing the process steps in the claims below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A device for processing and cataloging of a sample, in a container having a label with originating identifying data, wherein the sample is to be transferred to a processing cassette, the processing cassette having second identifying data thereon, the device comprising:
    a framework defining a work area, wherein the work area includes first and second locations for receiving the container and the cassette respectively;
    a set of cameras mounted in the framework;
    a controller system coupled to the cameras, the controller system including a controller and a non-transitory memory storing instructions, which, when executed by the controller, cause carrying out of computer processes comprising:
    causing members of the set of cameras to capture at a moment in time:
        an image of the sample in the work area;
        an image of the originating identifying data;
        an image of the second identifying data; and
        a set of images documenting a transfer of the sample from the container to the processing cassette;
    transforming the originating identifying data and the second identifying data into first and second digitally encoded texts respectively;
    comparing the first and second digitally encoded texts to assure consistency between the originating identifying data of the container label and the second identifying data of the processing cassette;
    processing the image of the sample so as to produce a data output characterizing attributes of the sample;
    integrating the data output into a catalog record output characterizing the sample, such record also including the originating identifying data; and
    analyzing the captured set of images documenting the transfer to identify a transfer error in which at least a portion of the sample has failed to have been transferred to the processing cassette.

2. A device according to claim 1, wherein processing the image of the sample includes forming a composite image that includes the image of the originating identifying data and the image of the sample.

3. A device according to claim 1, wherein the catalog record output includes the sample image, the image of the originating identifying data, and a time stamp indicating a time when the images of the originating identifying data and the sample were captured.

4. A device according to claim 1, wherein the captured set of images is a video recording.

5. A device according to claim 1, wherein the transfer error is one in which the portion of the sample to be transferred has been identified as missing.

6. A device according to claim 1, wherein the transfer error is one in which the portion of the sample to be transferred has remained in the container.

7. A device according to claim 1, wherein the transfer error is one in which the sample appears to have been transferred to an incorrect processing cassette, based on-failure of the second digitally encoded text to match the first digitally encoded text.

8. A device according to claim 1, wherein the computer processes further comprise assessing the data output characterizing attributes of the sample for compliance with minimum standards for downstream processing, and, in the event of such compliance, issuing a notice message to the user to submit the sample for downstream processing.

9. A device according to claim 8, wherein the attributes of the sample used for the assessing include a member selected from the group consisting of size of the sample, dimensions of each piece of the sample, color of each piece of the sample, contour locations in each piece of the sample, and combinations thereof.

10. A device according to claim 1, wherein the instructions establish a computer user interface configured to display to the user a distinct graphical representation of each one of a plurality of portions of the sample, along with an identification of the portion, at least one attribute of the portion, and a location of the portion.

11. A device according to claim 10, wherein the computer processes further comprise determining the at least one attribute of the portion by z-axis analysis of the image of the sample.

12. A device according to claim 10, wherein the computer user interface graphically indicates to the user a transfer error in which at least a portion of the sample has failed to have been transferred to the processing cassette.

13. A device according to claim 10, wherein the computer user interface graphically indicates to the user non-compliance of the attributes of the sample with minimum standards for downstream processing.

14. A device according to claim 1, further comprising a non-transitory storage medium in which is stored the catalog record output, the catalog record output including (i) the image of the sample, (ii) the image of the originating identifying data, and (iii) a time stamp indicating a time when the image of the sample and the image of the originating identifying data were captured.

15. A device according to claim 14, wherein the catalog record output includes a composite image that includes the image of the sample and the image of the originating identifying data.

16. A device according to claim 14, wherein the catalog record output further includes (iv) an image of the sample transferred to the processing cassette, (v) the image of the second identifying data, and (vi) a time stamp indicating a time when the image of the sample transferred to the processing cassette and the image of the second identifying data were captured.

17. A device according to claim 1, wherein the computer processes further comprise determining a first count of how many pieces were present in the container, determining a second count of how many pieces were present in the processing cassette, and comparing the first and second counts.

18. A device according to claim 1, wherein the computer processes further comprise providing a graphical user interface by which the user can approve:
  the transfer of the sample to the processing cassette;
  the first and second digitally encoded texts; and
  at least one attribute of at least a portion of the sample.

* * * * *